United States Patent [19]

Braun et al.

[11] Patent Number: 4,640,331
[45] Date of Patent: Feb. 3, 1987

[54] CENTRAL TIRE INFLATION SYSTEM

[75] Inventors: Eugene R. Braun, Royal Oak; Gary R. Schultz, Novi, both of Mich.

[73] Assignee: Eaton Corporation, Cleveland, Ohio

[21] Appl. No.: 617,644

[22] Filed: Jun. 4, 1984

[51] Int. Cl.⁴ .................. B60C 23/10; B60C 29/00
[52] U.S. Cl. ............................. 152/417; 152/416; 152/427; 137/224; 137/625.2; 303/9; 141/38
[58] Field of Search ............. 152/415, 416, 417, 427; 141/95, 38; 137/226, 625.2, 102, 224; 303/85, 9, 7, 20, 100, DIG. 1, DIG. 2; 73/146.2, 146.5

[56] References Cited
U.S. PATENT DOCUMENTS

| | | | |
|---|---|---|---|
| 2,634,782 | 4/1953 | Turek et al. | 152/417 |
| 2,976,906 | 3/1961 | Kamm et al. | 152/417 |
| 2,989,999 | 6/1961 | Holbrook et al. | 152/416 |
| 3,099,309 | 7/1963 | Horta et al. | 152/416 |
| 3,102,573 | 9/1963 | Winsen et al. | 152/416 |
| 3,276,502 | 10/1966 | Ruf | 152/417 |
| 3,276,503 | 10/1966 | Kilmarx | 152/417 |
| 4,313,483 | 2/1982 | Brockmann | 152/417 |
| 4,418,737 | 12/1983 | Goodell et al. | 152/416 |
| 4,421,151 | 12/1983 | Stumpe | 152/417 |
| 4,456,038 | 6/1984 | Gwaltney et al. | 152/415 |

Primary Examiner—Edward Kimlin
Assistant Examiner—Ramon Hoch
Attorney, Agent, or Firm—C. H. Grace; H. D. Gordon

[57] ABSTRACT

A central tire inflation system (10) comprising a pressure relief valve (180) fluidly interposed control means (142, 156, 164, 154, 172) and a tire valve assembly (56, 58) is provided. The control valve assembly is effective to selectively pressurize or exhaust a first conduit (170) connected to a first port (178) of the pressure relief valve, a second conduit (50, 52) extends from a third port (184) of the pressure relief valve to the tire valve assembly and a second port (182) is connected to atmosphere. The pressure relief valve is effective to establish fluid communication between said first and second ports thereof when the pressure in said first conduit exceeds the pressure in said second conduit and to establish fluid communication between the second conduit and the exhaust port (182) if the pressure in said second conduit exceeds the pressure in said first conduit. The tire valve assembly is fluidly connected to a third conduit (68) fluidly connected to the interior pressurized chamber (74) of an inflatable tire (12). The tire valve assembly is effective in response to pressurization of the second conduit above a first reference pressure and pressurization of said interior chamber above a minimum tire pressure reference value to establish fluid flow between said second and third conduits.

23 Claims, 16 Drawing Figures

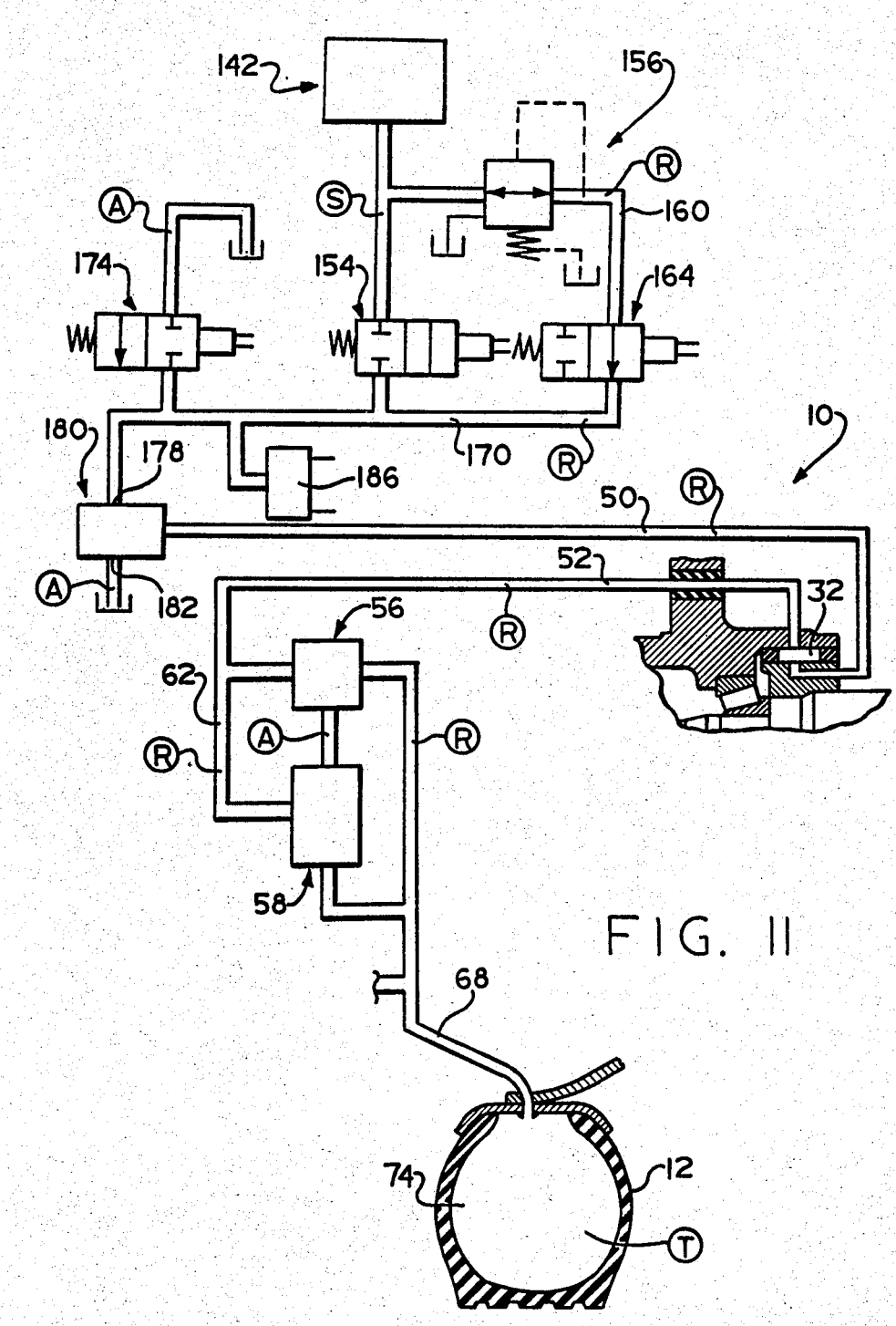
FIG. II

CENTRAL TIRE INFLATION SYSTEM

BACKGROUND OF THE INVENTION

1. Field of the Invention

The present invention relates to central tire inflation systems (CTIS), also known as onboard inflation systems and tire traction systems, wherein the inflation pressure of one or more vehicle tires may be controlled from a remote location (usually the vehicle cab) with the vehicle at rest and/or in motion and utilizing an onboard source of pressurized fluid (usually compressed air from the vehicle air brake compressor and/or a compressed air reservoir).

2. Description of the Prior Art

Central tire inflation systems, also known as tire traction systems, are well known in the prior art as may be seen by reference to U.S. Pat. Nos. 2,634,782; 2,976,906; 2,989,999; 3,099,309; 3,102,573; 3,276,502; 3,276,503; 4,313,483; 4,418,737, 4,421,151 and 4,434,833, the disclosures of all of which are hereby incorporated by reference. CTIS allow the operator to remotely manually and/or automatically vary and/or maintain the inflation pressure of one or more of the vehicle tires from the vehicle (usually a truck) air system, usually while the vehicle is in motion as well as when the vehicle is at rest.

It is well known that the traction of vehicles on relatively soft terrain (i.e. on mud, sand or snow) may be greatly improved by decreasing the inflation pressure within the tires. By decreasing the inflation pressure, the tire supporting surface (usually called the "footprint") will increase thereby enlarging the contact area between the tires and the terrain. Additionally, it is often desireable to decrease the tire pressure from the over-the-road or highway inflation pressure to increase riding comfort on rough roads. On the other hand, higher tire pressures decrease rolling resistance and tire carcass temperatures on smooth roads thereby increasing economy and safety. Accordingly, in cross country vehicles it is desireable to change the inflation pressure in the pneumatic tires to fit the terrain and is also desireable that a system be provided for changing the inflation pressure of the tires from an onboard source, while the vehicle is at motion or at rest and that the system be controlled from the vehicles operating cab. This is especially true for military vehicles which usually travel in columns whereby stoppage of the vehicle would delay the entire column. Additionally, if the military is under enemy attack, it is imperative that the vehicle maintain its maneuverability as long as is possible. If a tire has been damaged by gun fire or the like, it is desireable to be able to at least partially inflate the damaged tire, if possible, so that the vehicle remains mobile.

While CTIS are known in the prior art and have been utilized by the U.S. Army since at least World War II, the prior art systems are not totally satisfactory as the systems utilize conduits, valves and/or seals which were located at exposed locations rendering same vulnerable to damage over rough terrain, utilize valves and/or conduits which required venting at the wheel hub location thus exposing same to malfunction as a result of clogging due to water, mud, snow or the like, do not provide for automatic isolation of a vehicle tire subject to extreme damage, subject the rotary seal members to a differential pressure during steady state operating conditions thereby decreasing the life thereof and increasing the likelihood of leakage, do not provide a means whereby the compressed air stored in the vehicle tires during over-the-road conditions can be utilized to supplement the vehicle air brake system in emergency conditions wherein the vehicle air brake reservoir is at dangerously low operating pressures, do not provide means whereby the front and rear driving tires of a 4×4 or 6×6 or 8×8 vehicle could be inflated to different pressures, do not provide automatic control logic whereby the inflation/deflation time could be minimized and/or require drilling of passages in the axle housing and/or hub assemblies which may tend to weaken same and/or render retrofit of a CTIS to an existing vehicle more difficult and costly.

SUMMARY OF THE INVENTION

In accordance with the present invention, the drawbacks of the prior art have been minimized or eliminated by the provision of a central tire inflation system utilizing rotary seals which are located in a well protected inboard location (see U.S. Pat. No. 4,434,833 assigned to the Assignee of this invention), utilizing valves and conduits of a relatively rugged proven construction which may be located at a protected location or inside the vehicle tire to protect same, utilizing valving means which will automatically isolate a tire having less than a predetermined minimum reference pressure from the remainder of the system, utilizing valves and/or conduits which require no venting to atmosphere at the vehicle wheel assembly and which allows all venting of the system at a location on the vehicle chassis above the vehicle fording level, utilizing valve operation which will exhaust internal pressure on the rotary seals during steady state operation of the system, provides valving and control means allowing the pressurized fluid stored within the vehicle tires to be utilized by the vehicle air brake system during emergency conditions, provides means whereby the front and rear tires of a vehicle may be pressurized to different inflation pressures and requires only a single drilled opening in the wheel hub assembly to facilitate retrofitting of the system to an existing vehicle.

The above is accomplished by providing a central tire inflation system for a vehicle utilizing a valve assembly comprising a control valve and a low tire pressure shutoff valve at each wheel end assembly (usually a single or dual tire) which valve assembly is connected to the central control system by a single pressure line or conduit through a rotary seal assembly and pressurization of which single pressure conduit is effective to open and close communication to the vehicle tire and to cause inflation and/or deflation of said tire to a selected pressure. The valve assembly may be located exteriorly of the tire or may be located interiorly of the tire such as in the bead lock portion thereof. The low tire pressure shutoff valve is effective to automatically isolate the tire associated therewith from the remainder of the central tire inflation system when the inflation pressure thereof is below a predetermined minimum reference value.

The single pressure conduit leading to the rotary seal at the wheel hub assembly is connected to a source of pressurized fluid through a plurality of control valves which are effective to open communication to the tire to measure the existing pressurization thereof, to cause inflation or deflation of the tire as required, to establish or block communication to the tire from the central tire inflation system and to exhaust the single pressure line during steady state conditions of the tire inflation system and to relieve pressure on the rotary seals. Preferably, the control valves, which may be separate or provided in a single valve block, are operated by a control, preferably a microprocessor control, which senses the tire inflation value selected by the operator, senses vehicle volicity and the current pressure condition of the vehicle air brake system and the inflation system reservoir.

Accordingly, it is an object of the present invention to provide a new and improved central tire inflation system.

This and other objects and advantages of the present invention will become apparent from a reading of the following description of the preferred embodiments taken in connection with the attached drawings.

BRIEF DESCRIPTION OF THE DRAWINGS

FIG. 11 is a schematic illustration of the pneumatic components of FIG. 1 during the tire deflation mode of operation.

DESCRIPTION OF THE PREFERRED EMBODIMENT

Figure 1:
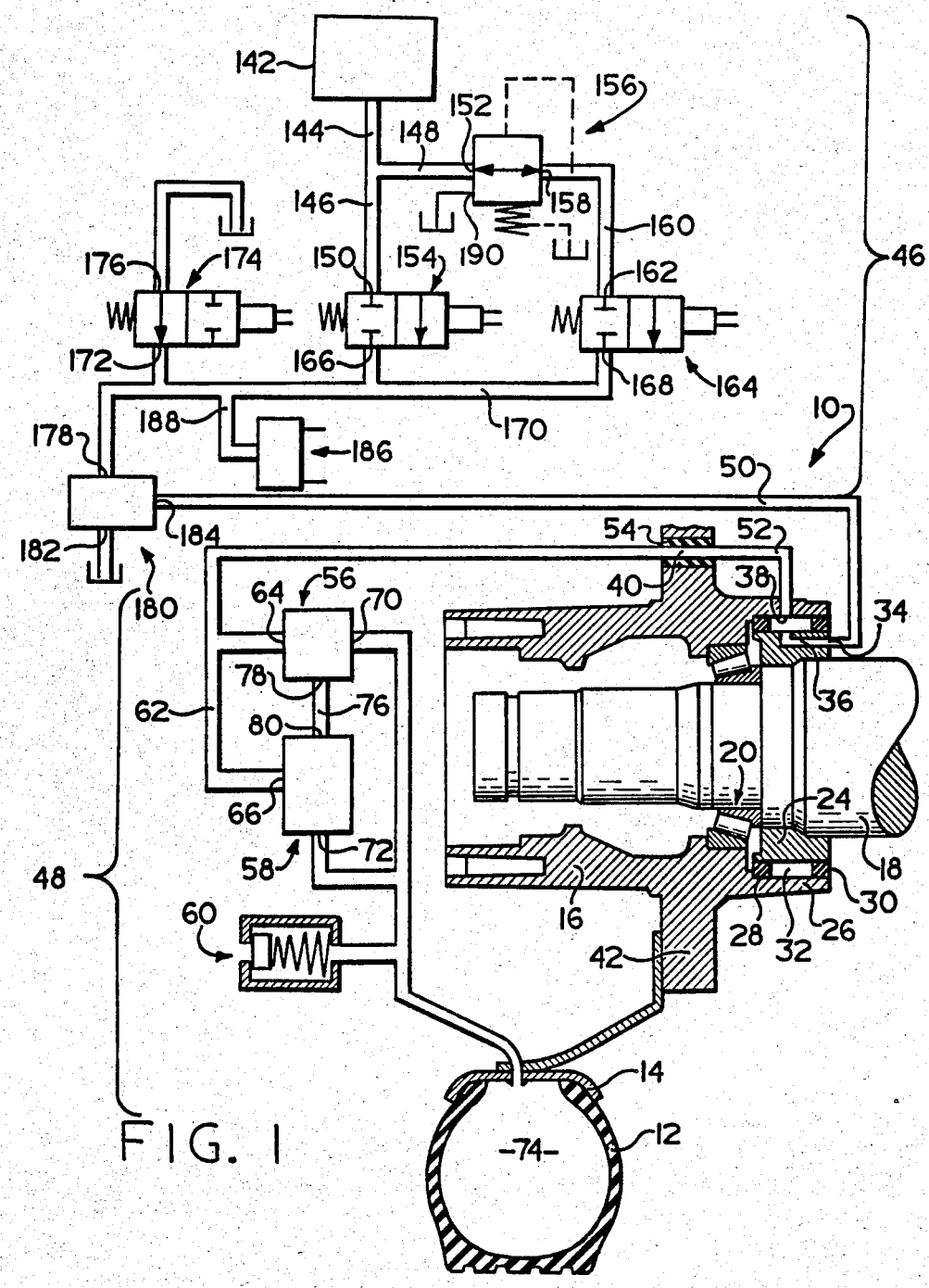
FIG. 1 is a schematic illustration of the pneumatic components of the present invention as utilized to control the inflation of a single tire.

In the following description of the present invention, certain terms will be utilized for purposes of reference only and are not intended to be limiting. The terms "upward", "downward", "rightward" and "leftward" refer to directions in the drawings to which reference is made. The terms "inward", and "outward", respectively, refer to directions towards and away from, respectively, the geometric center of the device described. The terms "inflation" and "deflation", respectively, refer to increased and decreased, respectively, pressurization of a tire or the like. Said terminology will include the words above specifically mentioned, derivatives thereof and words of similar import.

Figure 5:
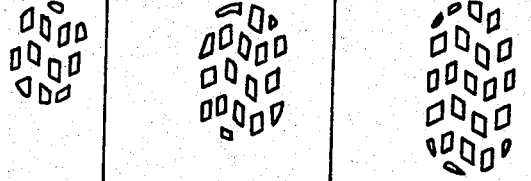
FIG. 5 is a diagrammatic representation of tire imprints at different tire inflation pressures.

The advantages of varying the inflation pressure of the pneumatic tires (especially the driven tires) of a vehicle, especially a relatively heavy duty vehicle, in accordance with the terrain over which the vehicle is traveling are well known in the prior art and may be appreciated by reference to FIG. 5. Assuming, for example, the vehicle rear drive axle tires are normally inflated to about 75 psi (pounds per square inch) for highway operation, decreasing the tire inflation pressure to about 30 psi for cross country travel over rough road or to about 20 psi for operation in sand, mud or snow conditions will result in the tire having a greater contact area, (i.e. footprint), and improved traction. In addition to improved traction at lower tire inflation pressure, the vehicle will be able to maintain a higher speed over poor ground, and reduce wear and tear on the vehicle, because of the smoother ride over "washboard" type terrain. Conversely, to reduce operating temperature and wear and tear on the tires at highway speed, a higher tire inflation pressure is desired. Of course, to increase mobility, it is highly desireable that the tire inflation pressures be controllable from the vehicle cab from an onboard source of pressurized fluid and be variable and maintainable with the vehicle in motion as well as when the vehicle as at rest. It is also highly desireable that the inflation pressure of the vehicle tires be variable and measurable independently of the central tire pressure inflation system for rapid checking and increasing or decreasing of the tire inflation pressure. This is especially desireable for initial inflation of the tires.

The pneumatic components of the central tire inflation system 10 as utilzed to control the inflation pressure of a single tire 12 may be seen by reference to FIGS. 1-4. The state of pressurization of the various conduits and the positions of the various valves illustrated in FIGS. 1-4, in the various modes of operation of system 10, may be seen by reference to FIGS. 6-11.

Inflatable tire 12 is mounted to a tire rim 14 which is fixed to a wheel hub assembly 16 rotationally supported on the outer end of an axle housing 18 by means of bearings 20. An axle shaft (not shown) rotationally driven by conventional means, such as a differential (not shown), extends from the axle housing 18 and typically includes a flange (not shown) for drivingly connecting the axle shaft to the wheel hub. As may be seen in greater detail by reference to U.S. Pat. No. 4,434,833, assigned to the Assignee of this invention, an annular sleeve 24 may be pressed to the axle housing at a location inboard of the bearings 20 and the wheel hub may define and inboardly extending sleeve-type annular flange 26 telescopically surrounding sleeve 24. A pair of rotary seals 28 and 30 extend radially between the outer periphery of sleeve 24 and the inner periphery of sleeve-type flange 26 to define an annular sealed chamber 32 therebetween. Sleeve 24 is provided with an inlet 34 and a passage 36 opening to the chamber 32. Sleeve-type flange 26 is provided with a generally radially extending passage 38 extending from the sealed annular chamber 32 to the exterior outer diameter surface thereof. A single passage 40 may be provided in the radial flange portion 42 of the wheel hub 16 for passage of a pressure conduit. The above construction is described in above mentioned U.S. Pat. No. 4,434,833 and forms no part of the present invention. It is understood, of course, that the present invention is equally applicable to wheel hub/axle housing assemblies (also called "wheel-end assemblies") of other constructions.

The central tire inflation system 10 may be considered to comprise two components, a stationary component 46 fixed to the vehicle chassis and a rotational component 48 rotationally fixed to the wheel hub 16 and tire 12. The stationary component 46 is fluidly connected to the rotational component 48 by means of the annular chamber 32 defined by the rotary seals 28 and 30. Briefly, fluid conduit 50 from the stationary component 46 is fluidly connected to the inlet 34 of passage 36 formed in sleeve 24 while fluid conduit 52 leading to the rotational component 48 is fluidly connected to the passage 38 formed in sleeve-type flange 26 and passes through the opening 40 defined in the flange 42 of the hub 16. To protect conduit 52, a grommet or bushing 54 may be provided in the opening 40 or opening 40 may be defined by a bore in a wheel stud. Of course, alternatively, a passage may be provided in hub 16 opening to the outboard side thereof. It may thus be seen that attachment of system 10 to a wheel end assembly requires no drilling of the axle housing 18 and drilling of only a single hole 40 through radial flange 42 of the wheel hub 16. Accordingly, initial installation and/or retrofit of system 10 to a vehicle is considerably simplified and will not weaken the load supporting structures of the axle housing and wheel hub. It is also noted that the rotary seals 28 and 30 and the conduit 50 leading to the wheel end assembly may be located at an inboard relatively protected location on the vehicle.

Rotating component 48 of system 10 includes a low pressure shutoff valve 56, a control valve 58 and a manual inflate and pressure check valve 60. Low pressure valve 56 and control valve 58 may be formed integrally and/or may be located interiorly of tire 12. The low pressure shut-off valve 56 and control valve 58 may be considered the tire valve assembly of system 10.

A manifold portion 62 of conduit 52 interconnects ports 64 and 66 of valves 56 and 58, respectively, with one another and with the conduit 50 via chamber 32 while a manifold conduit 68 interconnects ports 70 and 72 of valves 56 and 58, respectively, the manual inflate and check valve 60, and with the interior chamber 74 of the inflatable pneumatic tire 12. A conduit 76 interconnects ports 78 and 80 of valves 56 and 58, respectively. If dual tires are utilized, manifold conduit 68 may be split downstream of the valve 60 and manual shut-off valves provided to isolate the tires if required.

Figure 3:
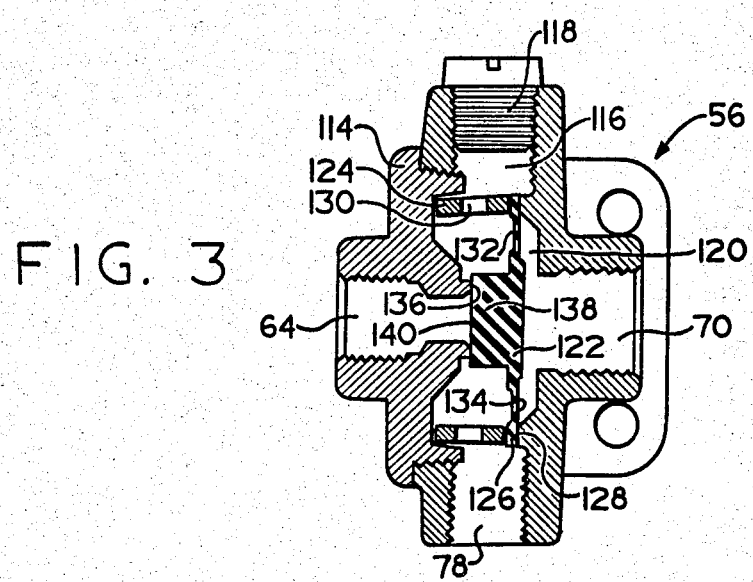
FIG. 3 is a sectional view of the low tire pressure shutoff valve schematically illustrated in FIG. 1.
Figure 2:
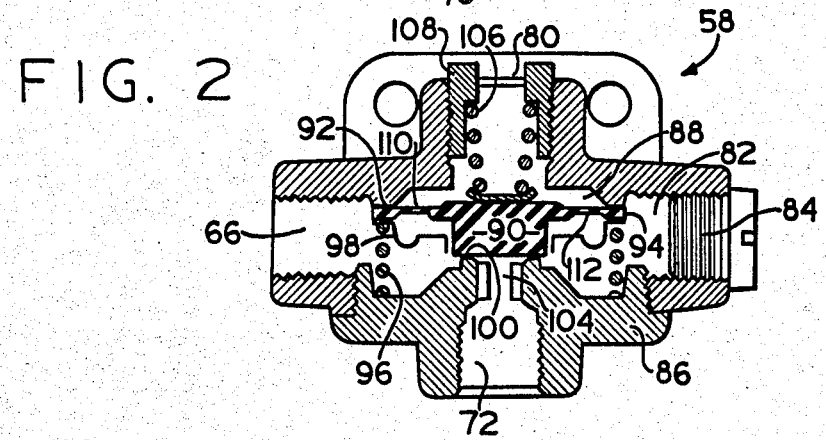
FIG. 2 is a sectional view of the control valve schematically illustrated in FIG. 1.

The detailed structure and operation of control valve 58 and low tire pressure shutoff valve 56 may be seen by reference to FIGS. 2-3, respectively. While the structure of the various valves utilized in the subject invention will be described with a certain degree of detail, it is understood that valves and/or combinations of valves performing the same function, but of a different structure, may be substituted therefor. It is also understood that while the various conduits and passageways are illustrated as a one piece construction, multi-piece construction may be substituted therefor.

As may be seen by reference to FIG. 2, control valve 58 is a diaphragm valve which, in an attempt to utilize commercially available, proven components, is a modified truck air brake quick-release valve of the type sold by Berg Manufacturing Company as Part No. AC15793. The valve 58 defines four ports, port 66 connected to manifold portion 62 of conduit 52, port 72 connected to manifold conduit 68, port 80 connected to conduit 76 and an inoperative port 82 sealed by a plug 84. Valve 58 includes a body 86 defining a central chamber 88 in which a plug type diaphragm 90 is received. The valve body 86, which may be a multi-piece structure, defines a first annular valve seat 92 sealed by the outer periphery 94 of the diaphragm 90 for controlling fluid communication between ports 80 and 66. A spring and spring retainer 96 and 98, respectively, urges the outer periphery 94 of diaphragm 90 into sealing engagement with the annular valve seat 92. The valve body 86 also defines an annular valve seat 100 normally engaged by the plug portion 102 of the diaphragm 90 to control fluid communication between ports 66 and 72. A sleeve 104 is received in port 72 to provide a reduced orifice therethrough. A spring 106 and spring seat 108 are provided to bias the plug 102 into sealing engagement with seat 100 as will fluid pressure at port 80 acting on the upper surface 110 of diaphragm 90 which is of greater area than the under surface 112 thereof. The reduced orifice allows the use of a smaller biasing spring 106.

Spring 106 biases plug 102 against valve seat 100 against a pressure in port 72 (connected to the tire 12 via conduit 68) of about 100 psi, thus, limiting maximum tire pressure to 100 psi. Of course, other maximum tire pressures may be selected. Should tire pressure exceed the maximum pressure, plug 102 will move off of seat 100 communicating ports 72 and 66 allowing the excess tire pressure to be relieved in a manner to be described below. Excessive tire pressure can occur due to improper filling through the manual inflate valve 60 and/or as a result of excessive operating temperatures of the tire 12. A pressure of about 10-20 psi at port 66, assuming port 80 is vented, acting on the under surface 112 of diaphragm 90 will lift the plug member 102 off of the seat 100 communicating ports 72 and 66 for establishing fluid communication between the tire and the seal chamber 32. As pressure at port 66 drops to below about 7 psi, spring 106 will again cause plug 102 to sealingly engage seat 100 to close the control valve. Accordingly, at less than about 7 psi pressure in conduits 50 and 52, the control valve 58 will be closed and at pressures above 10-20 psi, the control valve will be open between ports 66 and 72.

The low tire pressure shutoff valve 56 is illustrated in FIG. 3 and comprises a modified truck air brake system quick-release valve of the type available from Berg Manufacturing Company as Part No. AC15793, as is the control valve 58 described above. Low pressure shutoff valve 56 includes a valve body 114 defining four ports, port 64 connected to manifold portion 62 of conduit 52, port 70 connected to the interior chamber 74 of tire 12 via manifold conduit 68, port 78 connected to port 80 of valve 58 via conduit 76 and an unused port 116 sealed by plug 118. Valve body 114 also defines an interior chamber 120 in which a plug type diaphragm 122 is received. Valve 56 is modified by removal of the normally present diaphragm spring and replacement thereof by a sleeve member 124 which will rigidly hold the outer periphery 126 of the diaphragm 122 against the valve seat 128. Accordingly, port 70 is positively isolated from ports 64 and 78. Sleeve member 124 is provided with one or more apertures 130 to provide fluid communication between ports 64 and 78 and between port 78 and the under surface 132 of diaphragm 122 which is smaller in area than the upper surface 134 of diaphragm 122. Valve body 114 defines an annular valve seat 136 sealingly engageable by the plug portion 138 of the diaphragm 122 to control fluid communication between ports 64 and 78.

Figure 9:
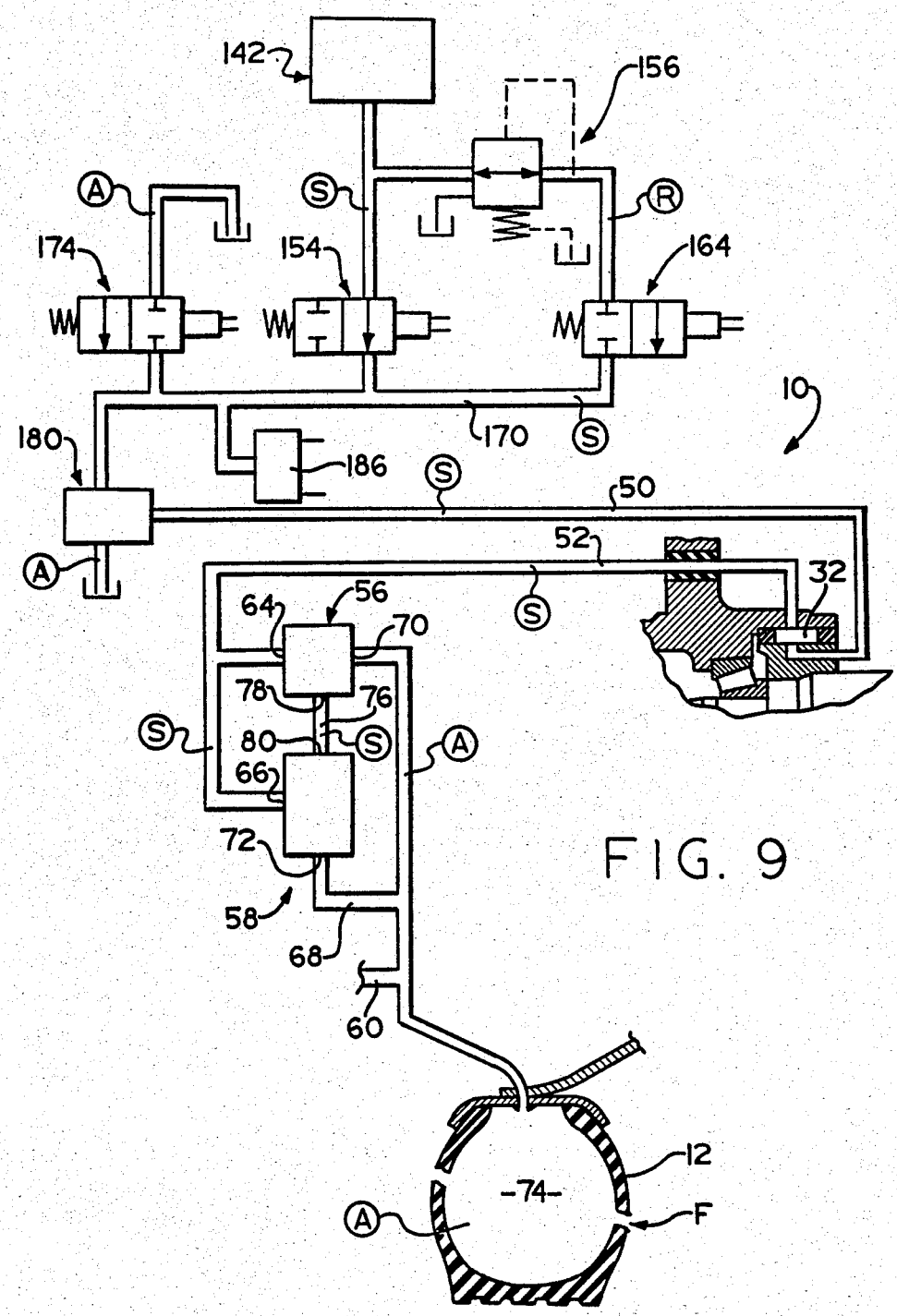
FIG. 9 is a schematic illustration of the pneumatic components of FIG. 1 illustrating the low tire pressure inflation prevention mode of operation.

The surface area 134 of diaphragm 122 exposed to tire pressure at port 70 is sized to be at least ten times as large as the surface area 140 of plug portion 138 of diaphragm 122 exposed to supply pressure at port 64. Accordingly, so long as at least a minimum pressure is present in tire chamber 74, even a ten times greater supply pressure in manifold portion 62 communicating with port 64 will not cause valve 56 to open communication between ports 64 and 78. Assuming the supply pressure at port 64 is never to exceed 110 psi, a pressure of greater than 10 psi in the tire and in conduit 68 will maintain valve 56 closed. However, in the event of extensive damage to tire 12 rendering the tire incapable of maintaining at least a minimum pressurization, pressurization of the supply conduit 62 will result in plug 138 moving off of valve seat 136 and fluidly communicating ports 64 and 78 which will cause supply pressure to be applied via conduit 76 to port 80 of the control valve 58, which supply pressure acting on the upper surface 110 of the diaphragm 90 of valve 58 will cause control valve 58 to remain in the closed position blocking communication between port 66 and 72 thus automatically isolating the damage tire. Thus, loss of system supply air through a damaged tire unable to maintain at least a predetermined minimum pressurization will be prevented allowing the remainder of the tire inflation system to inflate the remaining tires in a normal manner. This automatic damaged tire isolation mode of operation is illustrated in FIG. 9 and will be described in greater detail below. When the tire inflation system is shut down, pressure on top of the diaphragm 90 acting on surface 110 bleeds off around the outer periphery 94 and valve seat 92. Of course, for the system to operate, an initial tire pressure above the minimum tire pressure, 10 psi for example, must be provided to the tire 12 through the initial inflate and pressure check valve 60. The initial inflate and pressure check valve 60 is located in manifold conduit 68, or may be located directly in the tire rim, and is located downstream of the valves 56 and 58 for direct fluid communication to the interior chamber 74 of tire 12. Initial inflate and pressure check valve is of a standard tire valve stem construction as is well known in the prior art.

It is important to note that control valve 58 and low tire pressure shutoff valve 56, which are both located at the wheel end assembly, utilize structures wherein venting to atmosphere of the various chambers thereof occurs solely through the manifold portion 62 of conduit 52, as will be described in greater detail below, and thus the valves 56 and 58 will not be subject to clogging due to contamination by water, mud, snow or sand and/or may be located within the tire 12.

The relatively stationary portion 46 of the central tire inflation system 10 is mounted at convenient points on the vehicle chassis, preferably above the fording level of the vehicle, and is fluidly connected to the rotating portion 48 by means of a single conduit 50 and a single rotating seal chamber 32.

The relatively stationary portion 46 includes a source of pressurized fluid 142 which is typically the vehicle air system compressor, or, preferably, a pressurized air reservoir supplied by the compressor. Heavy duty trucks are typically equipped with an air compressor for an onboard compressed air system consisting of air brakes, transmission and/or axle shift actuators and/or controls, air suspensions and the like. If the vehicle is not otherwise provided with an air system, a separate compressor and/or reservoir or may be provided for the CTIS 10.

The source of pressurized fluid supplies compressed air, typically at a pressure not exceeding about 120 psi, to a split conduit 144 which defines branches 146 and 148 leading to the inlets 150 and 152, respectively, of inflate valve 154 and pressure regulator 156, respectively. Pressure regulator 156 defines an outlet 158 connected to a conduit 160 leading to the outlet 162 of deflate valve 164. The outlet 166 of inflate valve 154 and inlet 168 and deflate valve 164, respectively, are connected to a manifold conduit 170. Manifold conduit 170 is also connected to the inlet 172 of shutoff valve 174. Shutoff valve 174 has an outlet 176 connected to exhaust. Manifold conduit 170 is also connected to port 178 of quick-release valve 180. A pressure transducer 186 is exposed to the pressure in conduit 170 by means of a branch conduit 188.

Quick-release valve 180 defines a port 182 connected to exhaust and a port 184 connected to the conduit 50 leading to the wheel end assembly.

Pressure regulator 156 may be of any conventional design and will limit pressure flowing therethrough to conduit 160 to a relatively low pressure of about 8-10 psi, and further includes a relief port 190 leading to exhaust. Accordingly, it may be seen that the inlet 150 to the inflation valve 154 is exposed to supply pressure while the outlet 162 of deflate valve 164 is in communication with a regulated pressure of about 8-10 psi. As will be seen, pressure regulator 156 regulates the quick-release valve 180 and thus regulates the minimum pressure to which system 10 will deflate tire 12.

Inflate valve 154, deflate valve 164 and shutoff valve 174 are each relatively small flow two-way valves, preferably solenoid controlled valves, of conventional design. Valves 154, 164 and 174 have a first or closed position blocking fluid flow between the inlet and outlet ports thereof and a second or open position permitting fluid flow between the inlet and outlet ports thereof. Typically, the solenoid two-way valves 154 and 164 are spring biased to the closed positions thereof while valve 174 is spring biased to the open position thereof.

Figure 4:
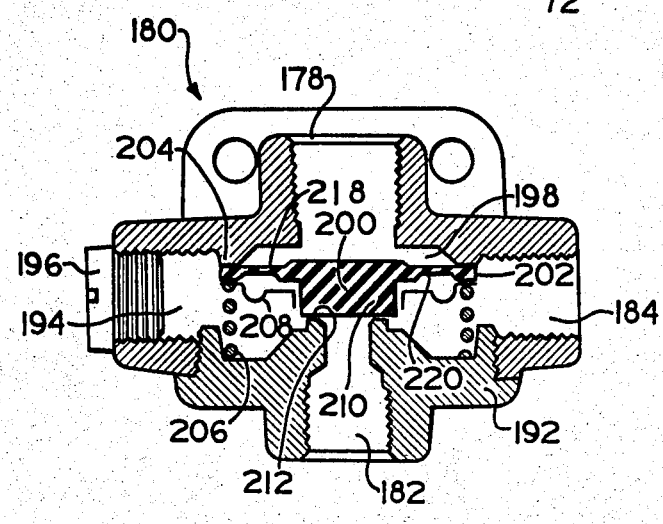
FIG. 4 is a sectional view of the quick release valve schematically illustrated in FIG. 1.

The detailed structure of quick-release or pressure release valve 180 may be seen by reference to FIG. 4. Briefly, the structure of quick-release valve 180 is substantially identical to the structure of control valve 58 described above with the exception of not utilizing an exhaust restrictor 104 as is utilized in the valve 58. The valve 180 defines a valve body 192 having four ports, port 178 connected to manifold conduit 170, port 182 connected to exhaust, port 184 connected to conduit 50 and an unused port 194 sealed by a plug 196. The valve body 192 defines a central interior chamber 198 in which a plug type diaphragm 200 is received. The outer periphery 202 of diaphragm 200 cooperates with an annular valve seat 204 to control the flow of fluid between port 178 and 184. A spring 206 and spring retainer 208 are utilized to bias the outer periphery 202 into sealing contact with the valve seat 204. The central plug portion 210 cooperates with an annular valve seat 212 at port 182 to control the flow of fluid between ports 182 and 184. Diaphragm plug portion 210 is biased into sealing engagement with valve seat 212 by means of fluid pressure in conduit 170 acting on upper surface 218.

The operational characteristics of quick-release valve 180 are that a fluid flow (i.e. flow of higher pressurized fluid to a conduit or chamber at a lower pressurization) may be maintained from port 178 to port 184. However, a fluid flow may not be maintained from port 184 to port 178 as diaphragm 200 will lift to open port 184 to the exhaust port 182. Further, the valve 180, by establishing fluid communication from port 178 to port 184 and from port 184 to exhaust 182 will tend to cause the pressurization at port 178 (conduit 170) and the pressurization at port 184 (conduit 50) to equalize at the pressurization of the lower pressurized conduit.

It is important to note that quick-release valve 180, through which the various valves at the wheel end assemblies are vented, is located remote from the wheel end assembly and may also be located remotely from the control valves, solenoid valves 154, 164 and 174. Quick-release valve 180 may be remotely controlled by a single pressure line 170 fluidly connecting port 178 of valve 180 with the solenoid valves via manifold conduit 170. As will be described in greater detail below, for quicker exhausting of the system and/or quicker operation of wheel end valves 56 and 58, a separate quick release valve may be provided at each axle or for each wheel end assembly.

By controlling the pressurization in conduit 170, the minimum pressure to which conduits 50 and 52 and all chambers fluidly connected thereto will automatically be vented through the quick-release valve 180 is also controlled. During the deflation mode of operation of system 10, the quick-release valve will exhaust conduits 50 and 52, which are then connected to the tire chamber 74 through control valve 58, to a pressure equalling the regulated pressure from regulator 156. During system shutdown (steady state operation), tire chamber 74 is isolated from the conduit 52 by control valve 58 and conduit 170 is exhausted to atmosphere through shut-off valve 174 allowing conduits 50 and 52 and the seal chamber 32 to be exhausted to atmosphere through the quick-release valve 180.

The pressure transducer 186 may be of any commercially available design and provides a signal, preferably an electric signal, indicative of the pressure in conduit 170.

The operation of the pneumatic components of central tire inflation system 10 is as follows. Under normal or steady state conditions, i.e. when tire inflation system 10 is not activated, the interior chamber 74 of tire 12, and thus manifold conduit 68, will be pressurized to some pressurization level greater than the minimum pressurization level, such as, for example, 75 psi for highway travel, 30 psi for cross country travel or 20 psi for operation in sand, mud or snow. If the pressurization of tire 12 is below the minimum pressure level (such as 10 psi) the tire must be pressurized to at least a minimum pressurization level by means of the manual inflate and pressurization check valve 60. In the steady state condition (see FIG. 6), the inflation valve 154 and the deflate valve 164 are closed and the shutoff valve 174 is open. Under these conditions, supply pressure is present in conduit 144 and regulated pressure is present in conduit 160. As the shutoff valve is open, conduit 170 is vented and thus the upper surface 218 of the diaphragm 200 of quick release valve 180 is exposed to atmospheric pressure only. Whatever pressure may be present in conduits 62, 52 and 50 will be vented to atmosphere as a result of such pressure acting on the lower surface 220 of diaphragm 200 causing the plug 210 to disengage the valve seat 212 connecting conduit 50 to exhaust through ports 184 and 182 of quick-release valve 180. As manifold portion 62 of conduit 52 is vented to atmosphere, there will be only atmospheric pressure present in ports 64 and 66 of valves 56 and 58, respectively and thus ports 70 and 72 of valves 56 and 58, respectively will be sealed to isolate the conduit 68 and the tire 12 at tire inflation pressure from the remainder of the system. As conduits 52 and 50 are vented, or quickly become vented through quick-release valve 180, the rotary seals 28 and 30 defining seal chamber 32 are exposed to atmospheric or substantially atmospheric pressure on both sides thereof.

In FIGS. 6, 7, 8, 9, 10 and 11 the pressurization of the various conduits and/or chambers is indicated by an "S" for supply pressure, "R" for regulated pressure (8–10 psi), "A" for atmospheric pressure or "T" for tire pressure.

Figure 12:
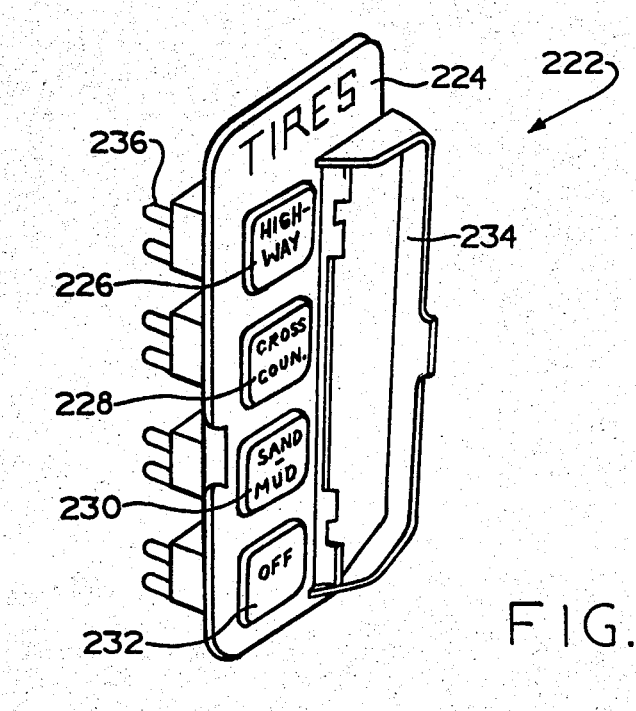
FIG. 12 is a prospective view of a possible operator control panel.
Figure 6:
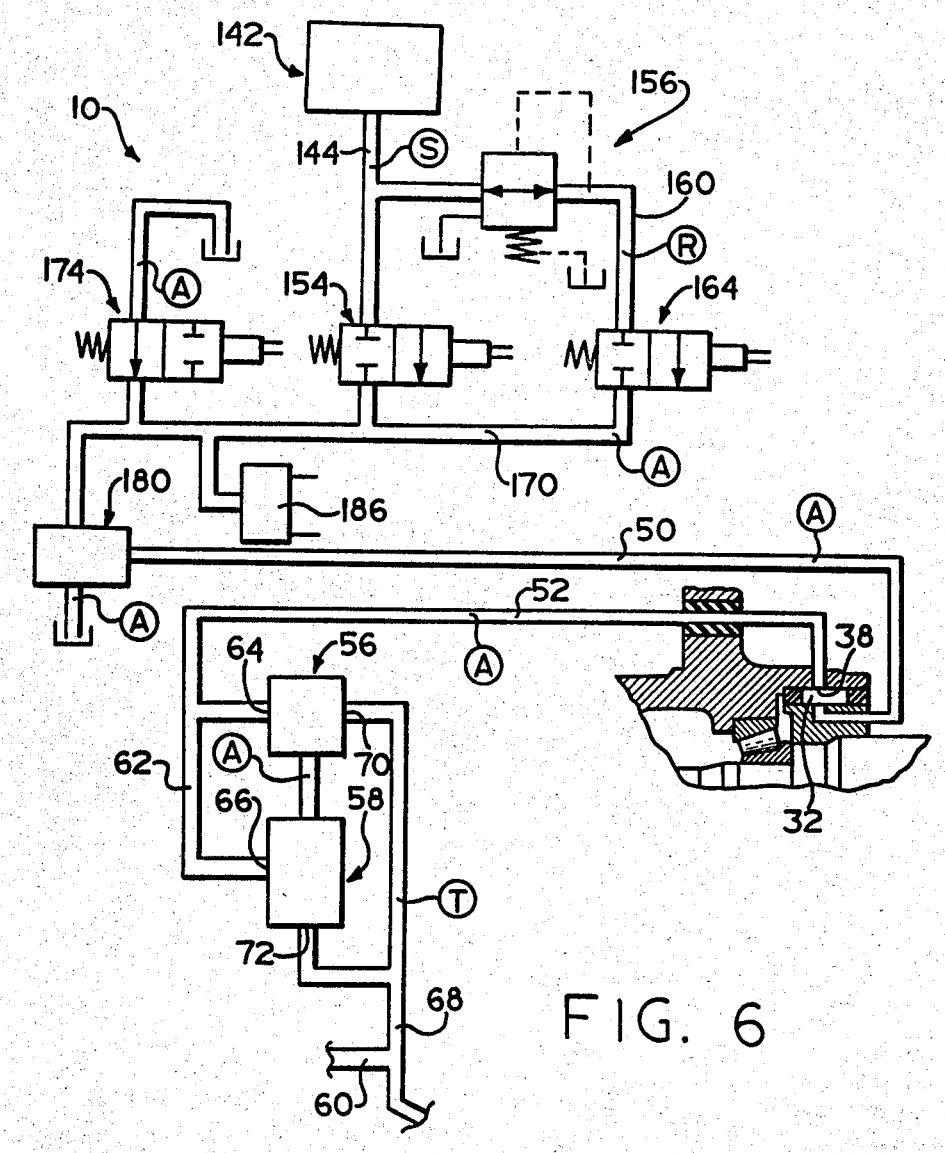
FIG. 6 is a schematic illustration of the pneumatic components illustrated in FIG. 1 during initial or steady state operating conditions.

Preferably, the operator is provided with a control panel 222 in the vehicle operating cab which control panel may be seen in greater detail by reference to FIG. 12. A typical control panel will include a panel body 224, preferably mountable in the vehicle dashboard, having a multiplicity (here shown as 4) of lightable push buttons 226, 228, 230 and 232. In the embodiment shown, push button 226 is marked "highway", push button 228 is marked "cross country", push button 230 is marked "sand, mud" and push button 232 is marked "off". Of course, additional control buttons may be provided and the operator may be provided with a gauge or LED or LCD readout indicating current tire pressure inflation and/or the operator may be provided with a control whereby a specific inflation pressure may be requested. The panel 222 includes a hinged blackout cover 234 for security purposes. Each of the control buttons includes connector means 236 for connection to a central control unit as will be described in greater detail below.

In one embodiment of control panel 222, a steady light at one of the buttons 226, 228 or 230 will indicate the pressure setting presently being maintained by the system 10. The operator may push another button and its light will blink until the new pressure is obtained at which time that button will glow steadily. If the operator pushes the off button 232, the control will select highway pressure and then deactivate the system and the off button will glow steadily. To provide maintenance of an operator or system selected pressure, the system will periodically monitor the pressure maintained in the various tires and take whatever corrective action (inflate or deflate) that is required to maintain said selected pressure. Insufficient air supply and/or other malfunctions may be indicative by blinking of the off button. As will be described in greater detail below, it is preferred that the control will sense vehicle speed and when the vehicle reaches a predetermined speed, such as 40 miles per hour, automatically inflate the tires to highway pressure and light the highway button 226. As a safety measure, the system will not respond to operator selection of cross country or sand-mud conditions by depression of buttons 228 or 230 above 40 miles per hour sensed vehicle speed.

When the operator selects an inflation pressure different from the current operating pressure, or during automatic periodic monitoring of current operating inflation pressures, the control unit must measure the current inflation pressures to determine if inflation and/or deflation is required to obtain or maintain the selected desired pressure.

Figure 7:
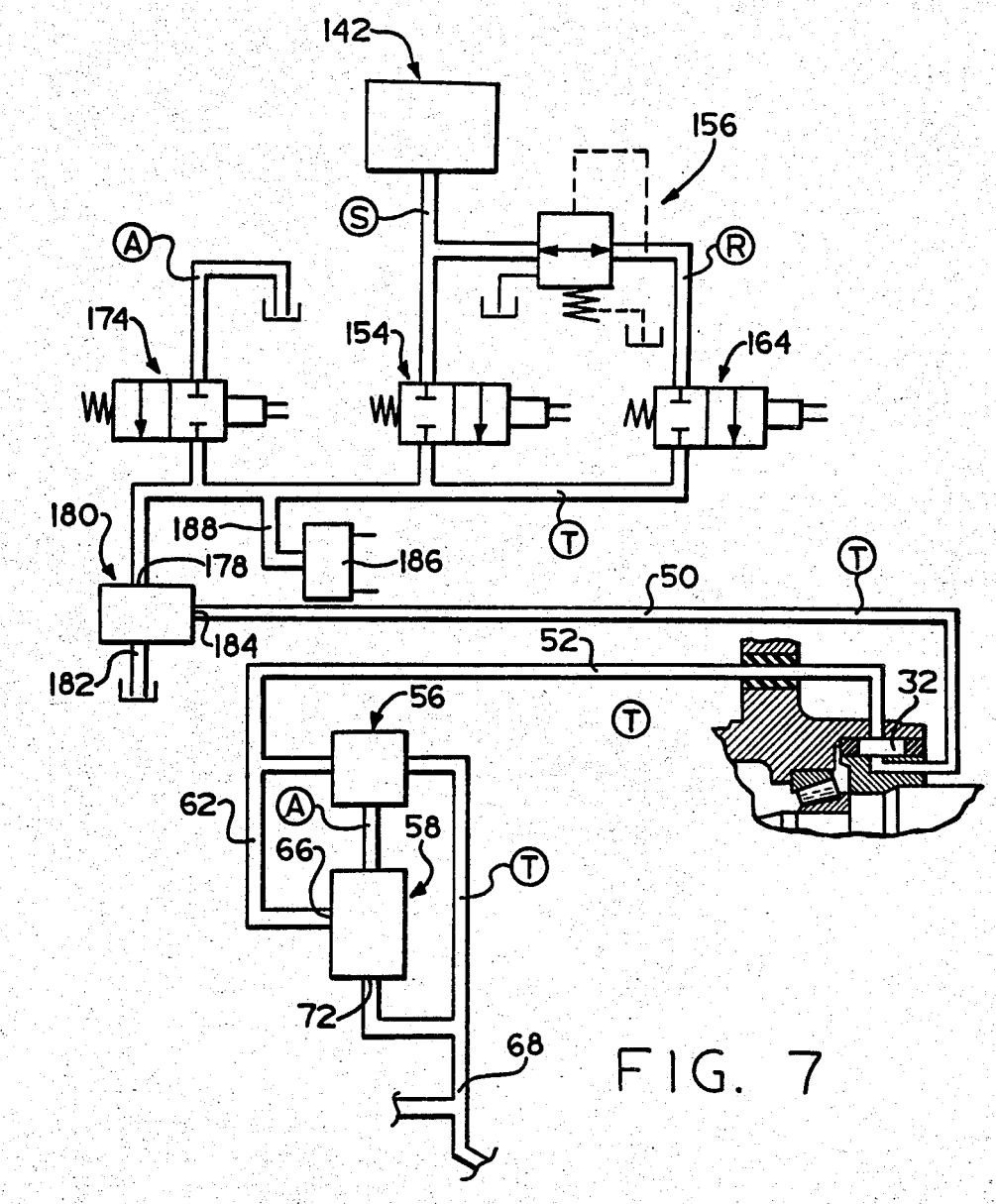
FIG. 7 is a schematic illustration of the pneumatic components of FIG. 1 during the tire pressure measurement mode of operation.

The pressure measurement mode of operation of system 10 is illustrated in FIG. 7. Briefly, the controller will close the inflate valve 154, the deflate valve 164 and the shut-off valve 174. The inflate valve 154 will then be quickly pulsed (i.e. quickly opened and then reclosed) which will cause supply air pressure to act upon the upper surface 218 of the diaphragm 200 of the quick release valve 180 thus pressurizing conduits 50, 52 and 62. Assuming the pressure in the tire and in conduit 68 is above the minimum pressure, the low tire pressure shut-off valve 56 will remain closed and the supply pressure at port 66 of the control valve 58 will act on the underside 110 of diaphragm 90 of valve 58 to open fluid communication between ports 66 and 72 of valve 58. Tire pressure in conduit 68 will retain the valve 58 in the open condition, and thus tire pressure or substantially tire pressure will be present in conduits 62, 52 and 50 and, by the action of quick release valve 180, in conduits 170 and 188 leading to pressure transducer 186. Accordingly, pressure transducer 186 will be exposed to the tire pressure and will provide a signal indicative thereof to the control unit. It is understood, that for an accurate measurement of tire inflation pressure the system must be at equilibrium (i.e. with little or no fluid flow) which is the case with control valves 154, 164 and 174 in the closed positions thereof.

Figure 8:
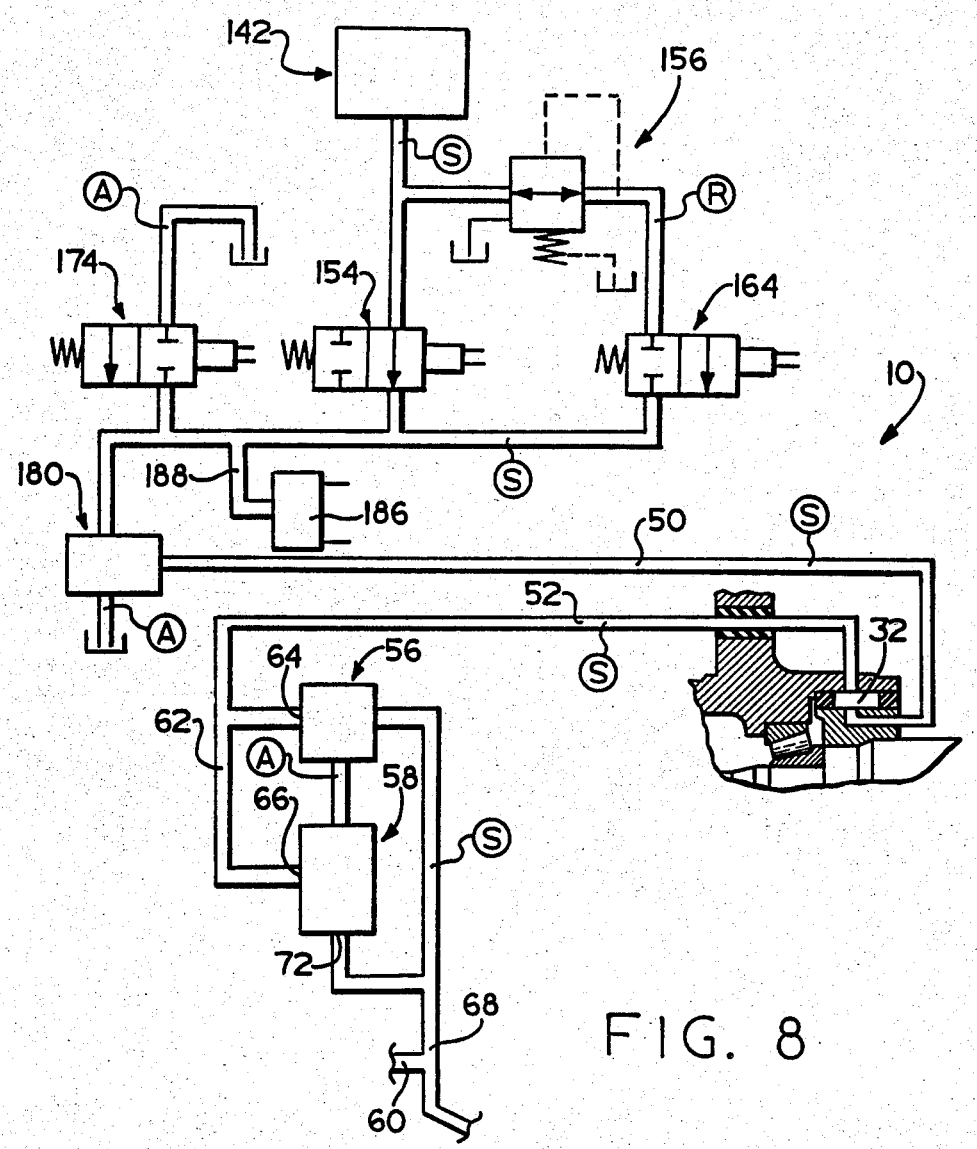
FIG. 8 is a schematic illustration of the pneumatic components of FIG. 1 in the tire inflation mode of operation.
Figure 10:
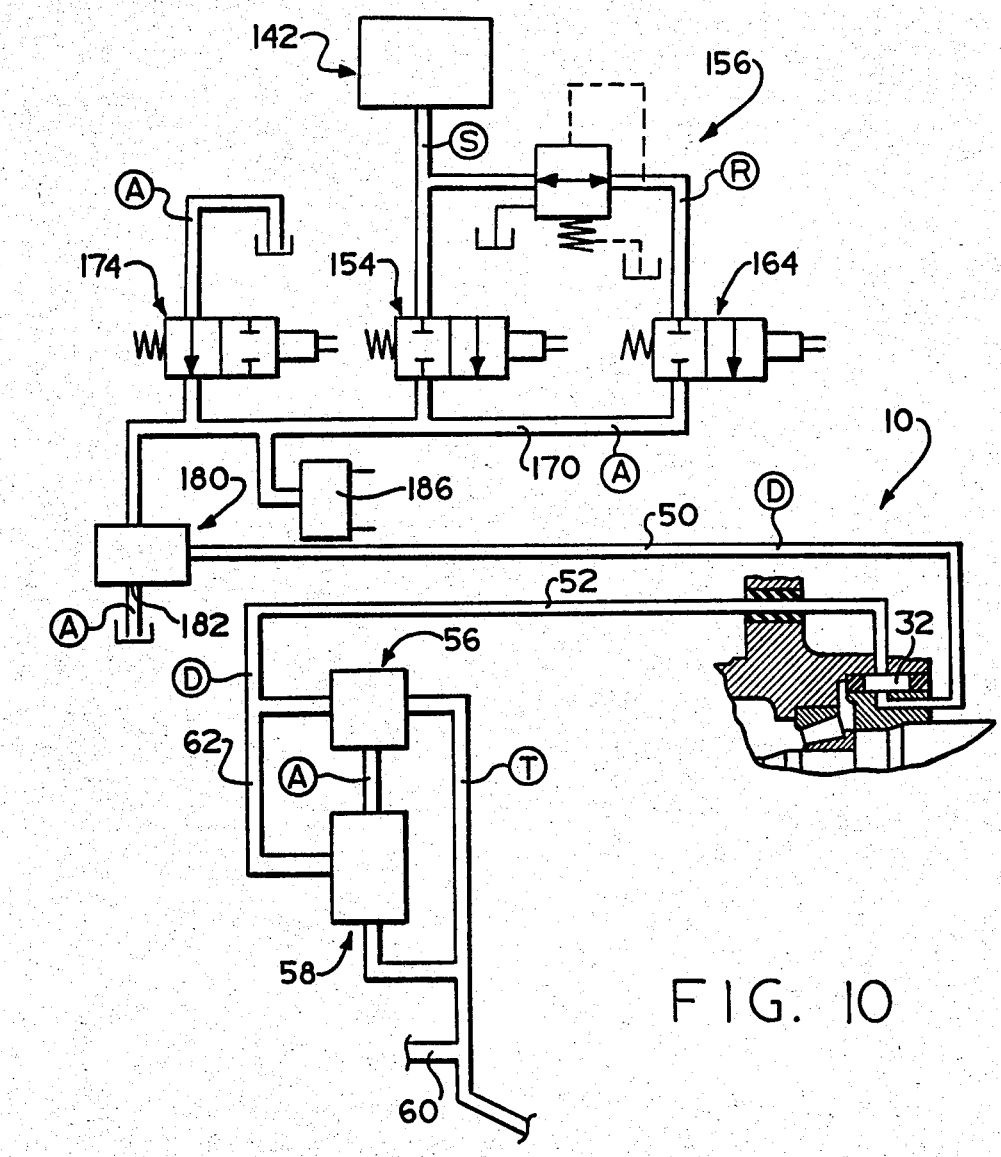
FIG. 10 is a schematic illustration of the pneumatic components of FIG. 1 during the system shutoff mode of operation.

The controller will then compare the present tire inflation pressure indicated by the signal from pressure transducer 186 to the desired tire pressure to determine if inflation or deflation is required. Should the controller determine that inflation is required, it will cause system 10 to assume its inflate mode of operation for a period of time as is illustrated in FIG. 8. Should the controller determine that deflation is required, it will cause the system to assume its deflate mode of operation as illustrated in FIG. 11. Should the controller determine that no action is required, it will cause the system to assume its system shut-off mode of operation as is illustrated in FIG. 10. Each of these modes of operation will be described in greater detail below.

If, based upon a comparison of current monitored tire inflation pressure and operator or controller selected desired pressure, the system control unit determines that inflation of the monitored tires is required, the system 10 will assume the inflation mode of operation illustrated in FIG. 8. In the inflate mode of operation, deflate valve 164 and shut-off valve 174 are closed and inflate valve 154 is opened for a period of time. At the end of the period of time the inflate valve 154 is closed and the inflation pressure of the tire, which is present in conduits 60, 62, 52, 50, 170 and 188 is sensed by pressure transducer 186 to determine what, if any, further action is required. Opening of inflate valve 154 with the shut-off valve 174 and deflate valve 164 closed will result in supply pressure in manifold conduit 170 which supply pressure will flow around the exterior periphery of the diaphragm of quick-release valve 180 and into the conduit 50, through the rotary seal chamber 32, into conduit 52 and manifold portion 62 thereof and into ports 64 and 66 of valves 56 and 58, respectively. Assuming the inflation pressure present in conduit 68 is above the minimum inflation pressure, low tire pressure shut-off valve 56 will remain closed and fluid pressure at port 66 of control valve 58 will act upon the undersurface 112 of diaphragm 90 to open port 66 to port 72 for inflation of the tire 12 via conduit 68.

It is noted that a single pressure or exhaust conduit path, conduit 52 is utilized to both open the control valve 58 and to inflate the tire 12, and that inflation occurs at full supply pressure for rapid inflation of tire 12. At the end of the period of time, the inflation valve 154 is closed. As the inflate valve is closed while retaining the shut-off valve and deflate valve in the closed condition, the control valve 58 will remain open and the quick-release valve 180 will allow tire inflation pressure to be monitored by the pressure transducer 186.

Upon obtaining an inflation pressure corresponding to the selected tire pressure (usually plus or minus a given percentage) the tire inflation system 10 will assume the shut-off mode of operation as illustrated in FIG. 10. In the shut-off mode of operation, the solenoid inflate valve 154 and deflate valve 164 are closed and the solenoid normally open shut-off valve 174 is open. Accordingly, manifold conduit 170 is exhausted to atmosphere, the pressure in conduits 62, 52 and 50 will rapidly exhaust to atmosphere via exhaust port 182 of the quick-release valve 180 causing the control valve 58 to close and the system 10 will assume the normal steady state condition illustrated in FIG. 6. As indicated above, to maintain a desired pressure, it is preferred that while in the steady state mode, the control unit will automatically periodically cycle through the system pressure measurement mode of operation illustrated in FIG. 7.

As discussed above, if one of the tires 12 suffers a catastrophic failure preventing the tire from maintaining at least the minimum inflation pressure (such as 10 psi) it is highly desireable to isolate that tire from the remainder of the central tire inflation system 10 so that the remaining tires may be inflated and/or deflated in a normal manner. The operation of the tire inflation system 10 with one of the tires inflated to below the minimum pressure may be seen by reference to FIG. 9. As may be seen, tire 12 has suffered a catastrophic failure "F" causing the inner chamber 74 thereof and manifold conduit 68 connected thereto to be essentially vented to atmosphere. Accordingly, chamber 70 of the low pressure shut-off valve 56 will be depressurized and only atmospheric pressure will act upon the upper surface 134 of diaphragm 122. As the inflation valve 154 is open, pressurizing conduit 62 and port 64 of valve 56, port 56 will be in fluid communication with port 78 causing conduit 76 and port 80 of control valve 58 to be pressurized, and thus supply pressure acting on the upper surface 110 of the diaphragm 102 of valve 58 will seal port 72 of the valve 58 from conduit 62 to isolate conduit 68 and tire 12 from the remainder of the inflation system 10.

Should the control unit of system 10 determine by the measurement mode of operation that deflation of the tires is required, the system will assume the deflate mode of operation as seen in FIG. 11. In the deflate mode of operation, conduits 50 and 170 are initially at substantially tire pressure, the solenoid inflate valve 154 and the solenoid shut-off valve 174 are closed and the solenoid deflate valve 174 is open. Accordingly, regulated pressure, such as 10 psi, will be present in conduits 160 and 170 and at port 178 of the quick-release valve 180. The deflate valve 164 is open for a period of time. Opening of the deflate valve will maintain the regulated pressure on the top of the diaphragm 200 of the quick-release valve 180 while the conduits 50, 52, 62 and 68 will quickly bleed down toward the regulated pressure as the control valve 58 will remain open following the system pressure measurement mode of operation. As a pressure differential will exist between the interior chamber 74 of tire 12 and the conduit 68, the tire 12 will continue to deflate and air will be exhausted through the quick-release valve port 182. After the period of time, the deflate valve will be closed and system pressure will be measured to determine if further deflation and/or inflation is required. It is important to note that the pressure in conduit 170 and thus in port 178 of the quick-release valve will cause the quick-release valve to close and prevent further venting of the tire 12 below a predetermined regulated pressure which pressure is above the minimum pressure of the tire 12 which will cause opening of the low tire pressure shut-off valve 56.

Figure 13A:
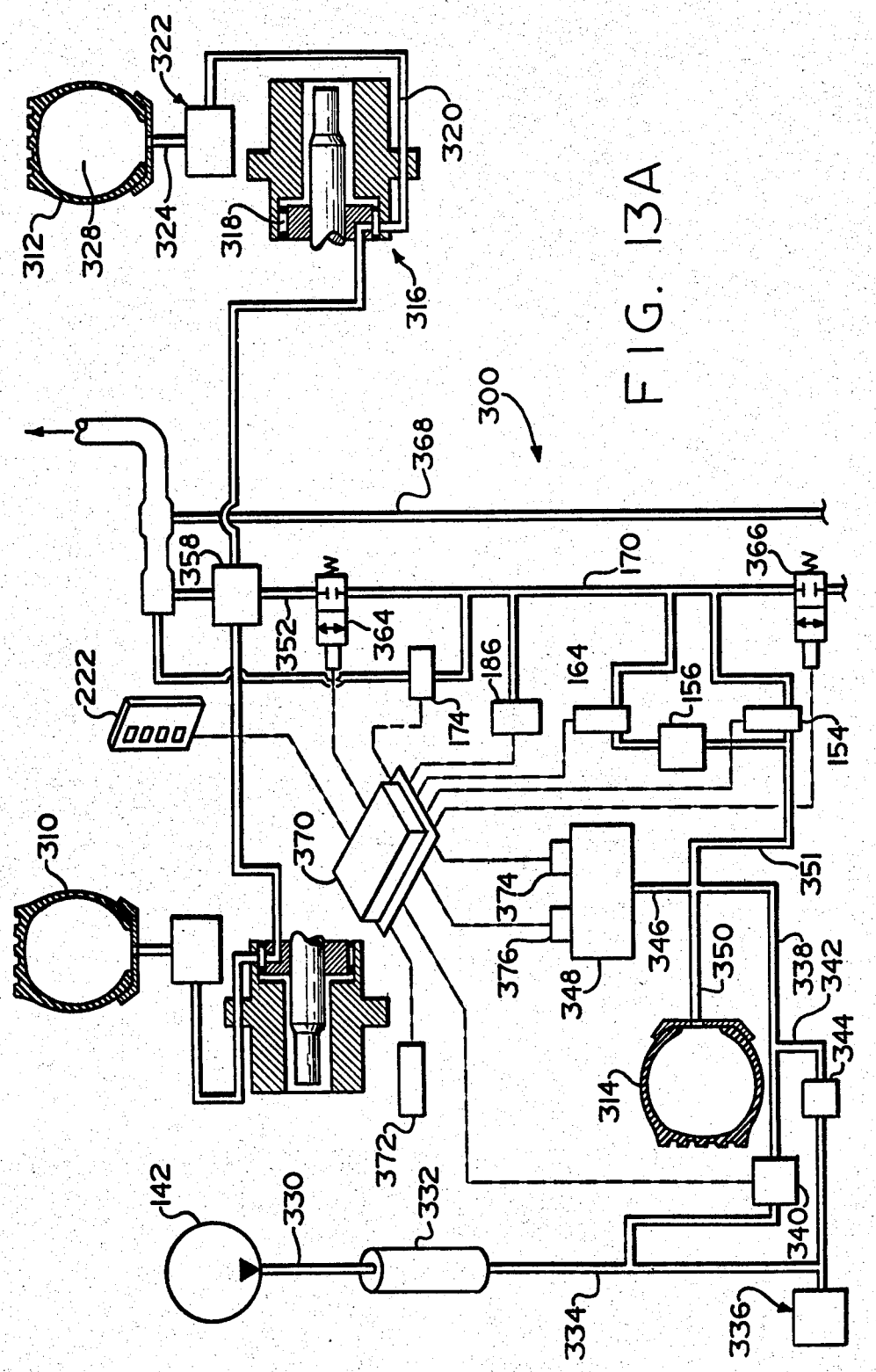
FIG. 13 is a schematic illustration of the central tire inflation system of the present invention as utilized in a 6×6 vehicle.
Figure 13B:
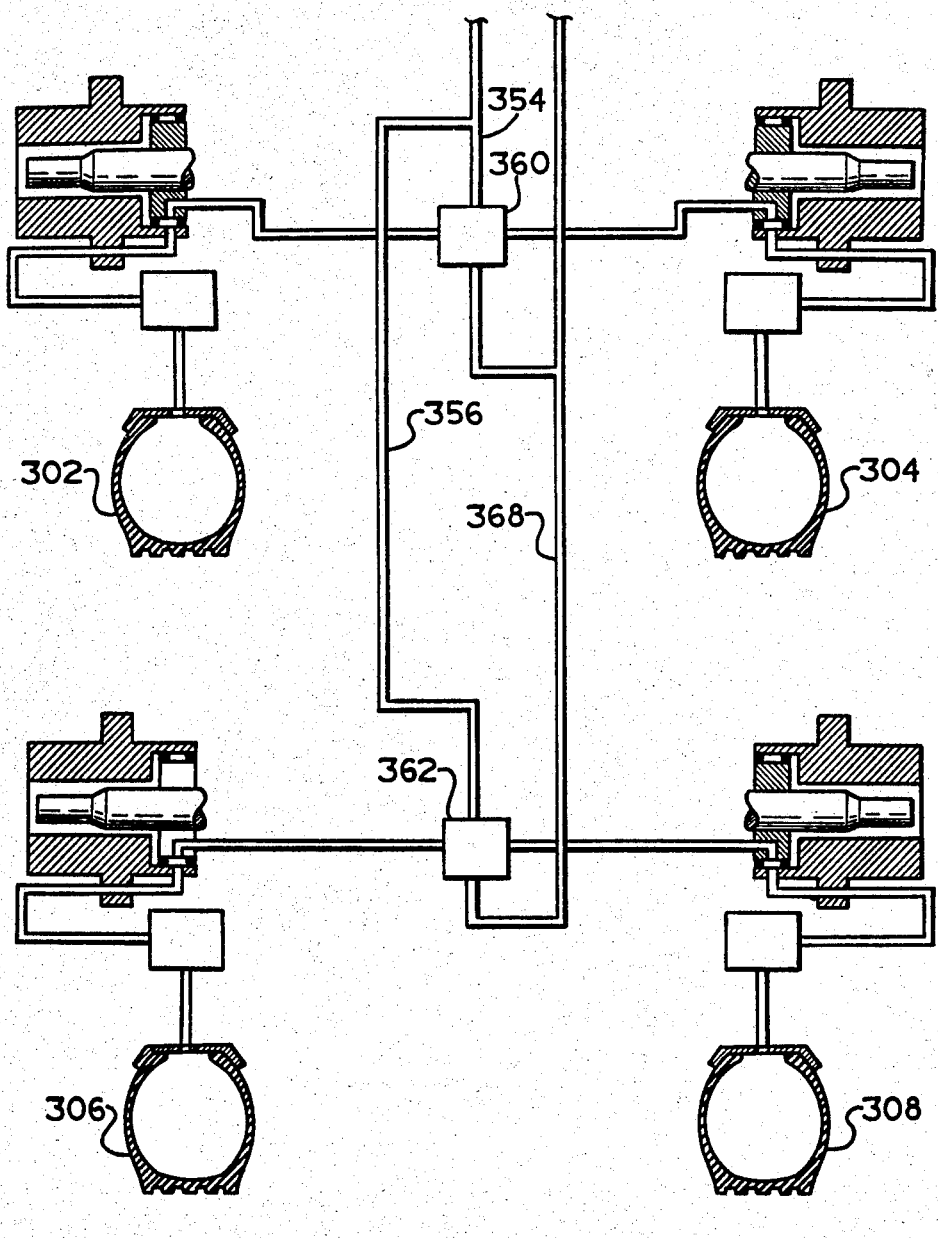

A central tire inflation system 300 for a multi-axle vehicle, such as a 6×6 truck, may be seen by reference to FIG. 13. In the description of central tire inflation system 300, elements which are structurally and functionally similar or identical to elements of system 10 described above will be assigned like reference numerals. The central tire inflation system 300 will control the inflation pressure of the four driven rear tires 302, 304, 306 and 308 and of the two driven front tires 310 and 312. Although the rear tires are illustrated as single tires, it is understood, of course, that dual tires may be substituted therefore as is well known in the prior art. The central tire inflation system will also fluidly communicate with the spare tire 314. Tires 310 and 312 are located on opposite ends of a front drive steer axle (not shown) while tires 302 and 304 are located at opposite ends of a front-rear tandem drive axle (not shown) and tires 306 and 308 are located on opposite ends of a rear-rear tandem drive axle (not shown).

Each of the axles includes a wheel-end assembly 316 defining a rotary seal chamber 318 from which a conduit 320 extends to a tire valve assembly 322 comprising valves substantially identical to the low pressure shut-off valve 56 and control valve 58 described above. A conduit 324 in which a manual inflate and pressure measurement valve 326 is received extends from the valve assembly 322 to the interior chamber 328 of the tires. Accordingly, as may be seen, each of the axle ends includes a rotational system component structurally and functionally similar or substantially identical to the rotational component 48 described above in connection with central tire inflation system 10.

The system 300 includes the on-board vehicle air compressor 142 connected by a conduit 330, to the air brake wet tank 332, which tank communicates via conduit 334 with the air brake system 336. Conduit 334 is connected by a conduit 338 to the central tire inflation system 300. Fluid flow through conduit 338 is controlled by a priority valve 340 which will allow fluid flow to the system 300 from the brake supply conduit 334 only if the available pressure in conduit 334 is greater than a preselected reference value, which reference value is above the air brake application pressure. For example, if brake system 336 requires a 60 psi application pressure, priority valve 340 may be set to block communication to conduit 338 if the pressure in conduit 334 does not exceed 65-75 psi. A branch conduit 342 connects conduits 334 and 338, bypassing the priority valve 340, and includes a one-way check valve 344 allowing fluid to flow from the central tire inflation system 300 to the brake system 336 only. A branch conduit 346 connects the conduit 338 to a system reservoir 348 and a branch conduit 350 connects the conduit 338 to the spare tire 314. A further branch conduit 351 connects conduits 338, 346 and 350 to the inflation valve 154 and pressure regulator 156. For improved, quicker operation during the inflation mode of operation it is important to maintain a relatively large pressure differential between the supply pressure and the tire pressure. For this reason, as compressor 142 has a limited capacity, inflation of the tires is normally accomplished from the reservoir 348 and/or the reservoir defined by the spare tire 314 which reservoirs are charged with pressurized fluid from the compressor 142.

A manifold conduit 170 is provided which is fluidly connected to the outlets of inflate valve 154 and deflate valve 164 and to the inlet of shut-off valve 174. Manifold conduit 170 is connected to a first extension conduit 352 extending to the front axle, to a second extension conduit 354 extending to the front-rear axle and to a third extension conduit 356 extending to the rear-rear axle. Extension conduit 352 is connected to a front axle quick release valve 358, extension conduit 354 is connected to a front-rear axle quick release valve 360 and extension conduit 356 is connected to a rear-rear axle quick release valve 362. Quick release valves 358, 360 and 362 may be structurally and functionally identical to quick release valve 180 described above. The flow of fluid between manifold conduit 170 and extension conduit 352 is controlled by a front axle isolation valve 364 while the flow of fluid from manifold conduit 170 to extension conduits 354 and 356 is controlled by rear axle isolation valve 366. Isolation valves 364 and 366 are solenoid controlled normally open two-way valves having a first closed position blocking the flow of fluid therethrough and a second open position permitting the flow of fluid therethrough.

Operation of the central tire inflation system 300 is controlled by a central control unit 370 which is preferably microprocessor based. Of course, other controls of the manual, electric, mechanical and/or pneumatic type may be substituted therefor. Control 370 is electrically connected to the operator control panel 222, isolation valve 364, shut-off valve 174, pressure transducer 186, deflate valve 164, inflate valve 154, isolation valve 366, speed pickup 372, priority valve 340, a low pressure switch 374 on the system reservoir 348 and to an adequate pressure switch 376 on the system reservoir 348 for receiving input signals therefrom and/or generating control signals thereto. A single switch monitoring pressure may replace switches 374 and 376.

As mentioned briefly above, in the inflate mode of operation, it is important to maintain a relatively large pressure differential between the supply pressure and the vehicle tires to assure adequate fluid flow rate inflation of the tires at a rate considerably greater than the leakage rate of the system. Typically, the vehicle compressor 142 is not of sufficient capacity to maintain an adequate supply of pressurized fluid to inflate the tires at a rate desirably greater than the leakage rate of the system. Accordingly, the compressor 142 is utilized to maintain a relatively large reservoir of pressurized fluid in reservoir 348 and/or spare tire 314. During the inflation mode, if the pressure in reservoir 348 and spare tire 314 is adequate for proper inflation of the tires, as indicated by a signal from the adequate pressure switch to the control 370, the control will permit continued system operation in the inflation mode. However, if the pressure in the reservoirs 348 and spare tire 314 is inadequate, a signal from the low pressure switch 374 to the controller 370 will interrupt the inflation mode of operation, i.e. block the outlet from the reservoir, and the compressor 142 will be utilized to recharge the reservoir until adequate pressure is again obtained allowing continuation of the inflation mode of operation.

As has been mentioned briefly above, in those vehicles having front drive-steer axles, such as 4×4, 6×6, 8×8 type vehicles, it is often highly desireable to inflate the front and rear tires to different inflation pressures in view of the weight distribution of the vehicle. The present central tire inflation system 300 provides for this by means of the isolation valves 364 and 366. Briefly, by opening isolation valve 364 and closing isolation valve 366, the inflation pressure of tires 310 and 312 may be monitored or controlled independently of the rear tires. Similarly, by closing of inflation valve 364 and opening of isolation valve 366, the inflation pressure of the rear tires 302, 304, 306 and 308 may be monitored and/or controlled independently of the inflation pressure of the front tires 310 and 312. Preferably, upon operator selection of a desired inflation level, such as highway, cross country or mud/snow, the control 370 will automatically adjust the inflation pressure of the front and rear tires independently.

It is well known that, above a certain vehicle speed, such as for example 40 miles per hour, the tires should be inflated to the highway inflation pressure levels thereof. By way of example, in a 6×6 vehicle with substantially equal load distribution, for over-the-highway conditions a typical desireable inflation pressure of the rear tires would be 75 psi and the desireable inflation pressure of the front tires would be 90 psi. Inflation of the tires to the highway pressurization level thereof is desired to prevent excessive wear and/or temperature build-up which might result in operating same at the cross country (30 psi) or mud-snow (20 psi) pressurization at relatively fast vehicle speeds. Accordingly, system 300 is provided with a means such as speed pickup 372 for monitoring vehicle speed and the control unit 370 is provided with logic rules by which above a certain sensed vehicle speed the tires will automatically be inflated to the highway pressures thereof.

Figure 14:
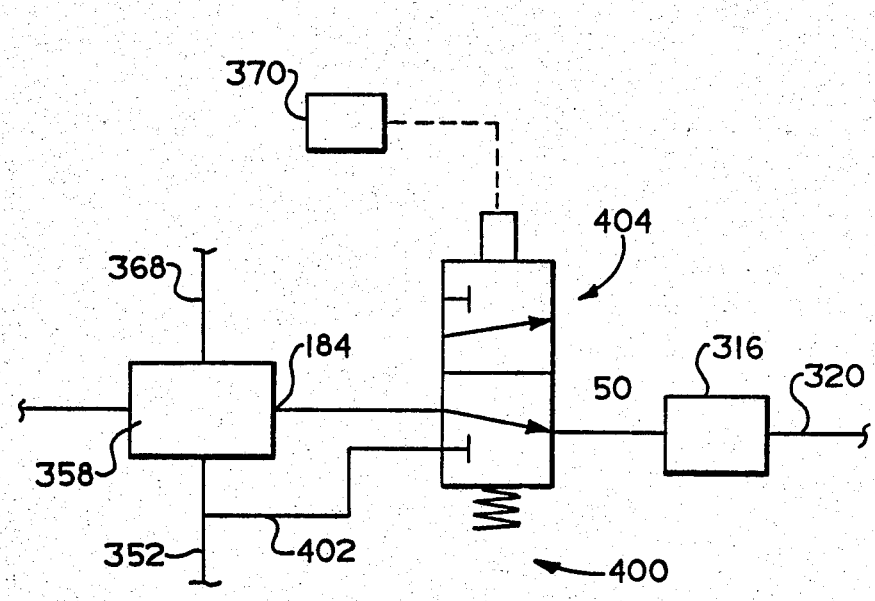
FIG. 14 is a schematic illustration of an alternate embodiment of the present invention.

In an alternate embodiment of system 300, see FIG. 14, the vehicle tires, 302, 304, 306, 308, 310, 312 and 314 may be utilized, on an emergency basis, to supply air pressure to the vehicle brake system. In a typical vehicle air brake system for a heavy duty truck, the air brake system, including wet tank 332, will have a capacity of about three cubic feet while each of the tires have a capacity of about eight cubic feet. Accordingly, the vehicle tires (including the spare 314) may be considered as having a capacity of at least ten times the capacity of the air brake system. As may be seen by reference to FIG. 13, spare tire 314 and reservoir 348 are connected directly to the air brake system 336 by means of conduits 338 and 342, which conduits are controlled by priority valve 340 and check valve 344, respectively. Priority valve 340 will prevent the flow of fluid from conduit 334 to the spare tire, reservoir or the remainder of the central tire inflation system at any time that the pressure in conduit 334 and wet tank 332 is less than a preset value, which preset value is selected to be about 5-15 psi greater than the spring brake application pressure. For example, if spring brake application pressure is 60 psi, the priority valve 340 will close at any time that pressure and conduit 334 falls below 65-75 psi. Check valve 344 is a one way valve allowing pressurized fluid in the spare tire 314 the reservoir 348 from the tire through conduit 338 to flow to the brake system 336. Accordingly, without further action by the control unit 370, the spare tire 314 and the reservoir 348 will act as emergency reservoirs for the brake system 336.

Alternate embodiment 400 is similar to system 300 with the exception of a by-pass conduit 402, controlled by a three-way two position by-pass valve 404, which extends from one or more of the extension conduits, 352, 354 and/or 356, directly to the conduits 50 fluidly connected to wheel end assemblies 316 by-passing the quick-release valves 358, 360 and/or 362. Valves 404 are preferably solenoid controlled valves operated by controller 370 and are biased to a first position blocking the flow of fluid through conduit 402 and allowing fluid flow through conduit 50 from port 184 of quick-release valve 358 to wheel end 316. Valve 404 may assume a second position blocking flow between valve 358 and wheel end 316 through conduit 50 and establishing a direct fluid flow through by-pass conduit 402 between wheel end 316 and extension conduit 352.

In the alternate embodiment 400, the control unit 370 will receive an input signal from the priority valve 340 indicating that the priority valve is closed and thus the fluid pressure in conduit 334 and wet tank 332 is at a potentially dangerous level. Of course, wet tank 332 or conduit 334 may be provided with separate means to indicate lower than desired pressurization. At this time, a control unit 370 will measure the system pressure, i.e. the pressure levels of the drive tires to determine if system pressure is greater than the pressure at which priority valve 340 is closed. If the system pressure in the various tires, individually or collectively, is greater than the pressure at which priority valve 340 is closed, controller 370 will cause the inflate valve 154 and one or more of the isolation valves 364 and 366, to be opened and one or more of the by-pass valves 404 to be in the second positions thereof. Opening of the isolation valves and inflate valve will pressurize conduits 352, 354 and/or 356. Opening of the various by-pass valves 404 will cause opening of the control valves associated therewith thereby pressurizing the conduit 350 through conduit 170 and the inflate valve 154 with pressurized fluid from the tires which, due to the pressure differential, will flow through branch conduits 342 and check valve 344 to the brake system 336. As the tires 302, 304, 306, 308, 310 and 312 have approximately ten times the volume of the air brake system, each 1 psi depressurization of the tires should result in an increased pressurization at the air brake wet tank 332 and conduit 334 of about 10 psi, which increased pressurization along with operation of the vehicle compressor 142 should allow the air brake wet tank to be repressurized to a safe level.

By way of example, allowing the pressure in all seven tires, including the spare, to decrease one psi will supply a volume of pressurized air to the air brakes 336 sufficient to raise air brake system pressure approximately 10-20 psi.

Upon repressurization of the wet tank to an acceptable level, the isolation valves, by-pass valves and inflate valve will be closed allowing the system to resume its normal manner of operation.

Figure 15:
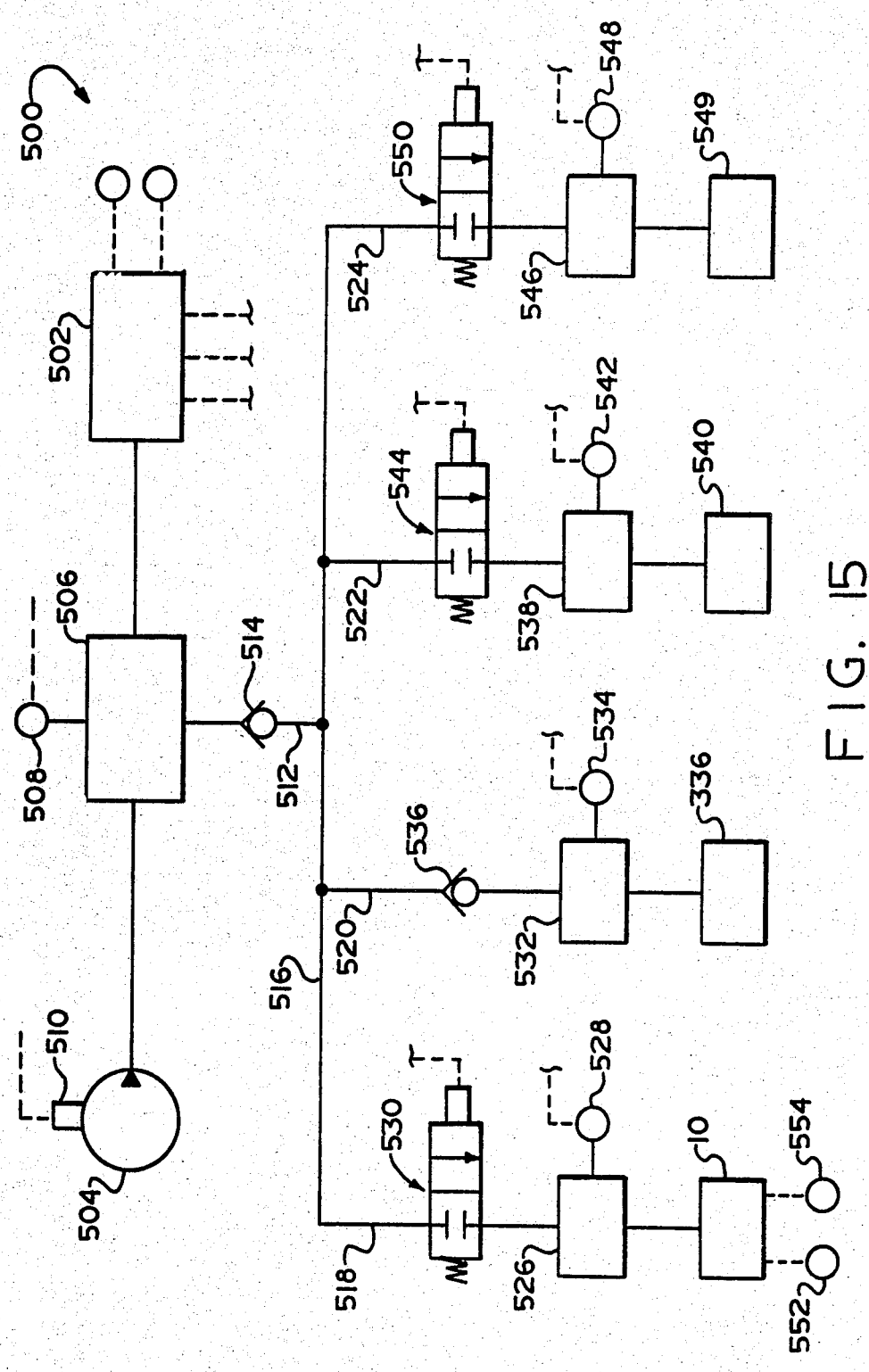
FIG. 15 is a schematic illustration of an alternate vehicle air system.

An alternate central tire inflation system and vehicle air management system 500 controlled by a controller 502, preferably a microprocessor base controller, may be seen by reference to FIG. 15. Combined system 500 includes a vehicle compressor 504 which supplies a main wet tank or reservoir 506. Wet tank 506 fluidly communicates with a pressure transducer 508 which provides input signals indicative of wet tank 506 pressure to the controller 502. The compressor includes an operator 510 controlled by controller output signals. The main wet tank 506 is fluidly connected to a main output conduit 512 having a one-way check valve 514 therein. Main output conduit 512 includes a manifold portion 516 fluidly communicating with several branch conduits 518, 520, 522 and 524.

Branch conduit 518 fluidly communicates with the central tire inflation system reservoir 526 which supplies the central tire inflation system 10. A pressure transducer 528 supplies input signals to the controller indicative of reservoir 526 pressure and a two-way two-position valve 530 controlled by the controller 502 controls the flow of fluid through conduit 518 from the manifold conduit 516 to the reservoir 526.

Branch conduit 520 fluidly communicates with the air brake reservoir 532 which supplies the vehicle air brakes 336. A pressure switch 534 supplies input signals to the controller indicative of reservoir 532 pressure equalling or exceeding a reference pressure. A one-way check valve 536 controls the flow of fluid through branch conduit 520 from the manifold 516 to the brake system reservoir 532.

Branch conduit 522 fluidly communicates with the vehicle air suspension reservoir 538 which supplies the vehicle air suspension components 540. A pressure switch 542 supplies input signals to the controller 502 indicative of reservoir 538 pressure and a two-way two position valve 544 controlled by the controller 502 controls the flow of fluids through branch conduit 522 from the manifold conduit 516 to the reservoir 538.

Branch conduit 524 fluidly communicates with a miscellaneous system reservoir 546 which supplies miscellaneous vehicle operators 549 such as transmission shifting mechanisms, axle shifting mechanisms and the like. A pressure switch 548 supplies input signals to the controller 502 indicative of reservoir 546 pressure and a two-way two-position valve 550 controlled by the controller 502 controls the flow of fluid through conduit 524 from the manifold conduit 516 to the reservoir 546.

The central tire inflation system 10 includes input signal means 552 and output signal means 554 for receiving and transmitting, respectively, input and output signals, respectively, to the controller 502 for operation of the central tire inflation system in the manner described above. Accordingly, it may be seen that the controller utilized to control the operational functions of the central tire inflation system may also be utilized to control the remainder of the vehicle air system. Two-way two-position valves 530, 544 and 550 are preferably solenoid operated valves having a first closed position blocking flow of fluid through conduits 518, 520 and 524, respectively, and a second open position permitting flow of fluid through conduits 518, 520 and 524, respectively. The valves 530, 544 and 550 are preferably biased to the closed position thereof and are individually operable.

Preferably, the controller 502 is provided with logic rules whereby each of the various pressurized fluid operated systems 336, 10, 540 and 548 are assigned a relative priority and the reservoirs associated therewith, 532, 526, 538 and 546, respectively, are maintained at the desired level of pressurization in accordance to the priority associated therewith. The air brake system 336 and the reservoir 532 associated therewith is assigned the highest priority and will always be pressurized to a pressure level at least equal to the pressure in the other reservoirs 526, 538 or 546 and in the main wet tank 506. A less than desired level of pressurization in reservoir 532, as indicated to the controller by input signals from pressure transducer 534, will result in the controller maintaining the valves 530, 544 and 550 in the closed positions thereof and causing continued operation of the compressor 504.

Figure 16:
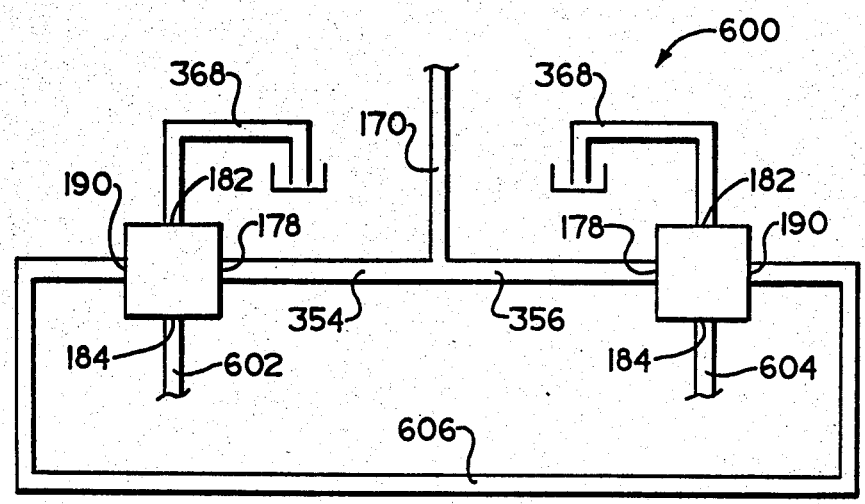
FIG. 16 is a schematic illustration of an alternate embodiment of the system of FIG. 13.

An alternate embodiment 600 of the system 300 discussed above may be seen by reference to FIG. 16. As in system 300, manifold conduit 170 branches into branch conduits 354 and 356 to the inlet ports 178 of quick-release valves 360 and 362, respectively. Ports 184 of quick-release valves 360 and 362 are connected to conduits 602 and 604, respectively, leading to the wheel end valves associated with front-rear tires 302 and 304, and rear-rear tires 306 and 308, respectively, which tires are to be at the same level of pressurization. Ports 182 of valves 360 and 362 are connected to an exhaust 368.

Embodiment 600 differs from system 300 in that ports 190 are not plugged but are fluidly interconnected by conduit 606. Accordingly, the surfaces 220 of valves 360 and 362 are at all times exposed to an equal pressure. Of course, the undersurfaces 220 of valves 360 and 362 could be fluidly interconnected in other manners.

In systems 300 and 600, upon pulsing of the inflation valve 154 for a system measurement, the tire control valves 58 will remain open and conduits 602 and 604 will be in fluid communication with the interior chambers 74 of the tires.

In system 300, each of the quick-release valves, 360 and 362 will exhaust conduit 602 or 604, or fluidly connect conduit 354 to conduit 602 or conduit 356 to conduit 604, respectively, to equalize the pressure in conduits 354 and 602 and conduits 356 and 604, respectively. Therefore, conduits 170, 354, 356, 602 and 604 and the interior chambers 74 of tires 302, 304, 306 and 308 will equalize at the pressure of the lowest pressurized tire 302, 304, 306 or 308. This may be undesirable. By fluidly connecting ports 190, the pressurization of the tires and conduits will equalize at the average pressure of tires 302, 304, 306 and 308 and little or no pressurized air will be lost during the measurement mode of operation.

Although the preferred embodiments of the present invention have been described with a certain degree of particularity, it is understood, of course, that certain substitutions for and rearrangement of the parts may be resorted to without departing of the spirit and the scope of the present invention as hereinafter claimed.

We claim:
1. A vehicle onboard tire inflation system comprising:
control means for selectively pressurizing and exhausting a first conduit;
a pressure relief valve having a first port for fluid connection to said first conduit, a second port for fluid connection to atmosphere and a third port connected to a second conduit; said pressure relief valve automatically responsive to fluid pressure in said first and second conduits and effective to establish fluid flow between said first and second conduits and to block said second port if the pressurization in said first conduit is equal to or greater than the pressurization in said second conduit, and to establish fluid flow between said second conduit and said second port and to block said first port if the pressurization in said second conduit is greater than the pressurization in said first conduit;
tire valve means rotatably mounted to an inflatable tire and having a fourth port for fluid connection to said second conduit and a fifth port fluidly connected with the interior pressurized chamber of said tire, said tire valve means automatically responsive to pressurization of said second conduit and of said interior pressurized chamber to establish and block fluid communication between said fourth port and said fifth port;

said tire valve means effective to establish fluid communication between said fourth port and said fifth port when said second conduit is pressurized to a pressure greater than a predetermined first reference pressure and said interior pressurized chamber is pressurized to a pressure equal to or greater than a minimum tire reference pressure;

said tire valve effective to establish fluid communication between said fourth and fifth ports, when the pressure in said interior tire chamber exceeds a maximum tire pressure reference value;

said tire valve effective to block communication between said fourth and fifth ports when the pressure in said second conduit does not exceed said first reference pressure and the pressure in said interior tire chamber does not exceed a predetermined maximum tire reference pressure; and said tire valve effective to block fluid communication between said fourth and fifth ports if said interior chamber of said tire is pressurized to a pressure less than said minimum tire reference pressure value regardless of the magnitude of pressure in said second conduit.

2. The central tire inflation system of claim 1, wherein said second conduit includes a first portion fixed to said vehicle, a second portion rotatable with said tire and a rotary seal chamber interposed said first and second portions, said third port of said pressure relief valve communicating with said first portion of said second conduit.

3. The central tire inflation system of claim 2, wherein said control means is effective to pressurize and exhaust said first conduit to a first pressure equaling the pressure available from a source of pressurized fluid, to a second pressure having a regulated value greater than atmospheric pressure but less than said supply pressure, and to a third pressure substantially equal to atmospheric pressure, said second pressure greater than said first reference pressure.

4. The central tire inflation system of claim 3, wherein said control means comprises a third conduit connectable to a source of pressurized fluid, an inflation valve having a sixth port connected to said third conduit and a seventh port connected to said first conduit, a pressure regulator having an eighth port connected to said third conduit, a ninth port connected to said first conduit and a tenth port connected to an exhaust to atmosphere and an exhaust valve having an eleventh port connected to said first conduit and a twelfth port connected to an exhaust to atmosphere, first control means for selectively establishing or blocking fluid communication between said sixth and seventh ports, second control means for establishing or blocking fluid communication between said eight port and said first conduit and third control means for establishing or blocking fluid communication between said eleventh and twelfth ports.

5. The central tire inflation system of claim 4, wherein said second control means is a deflation valve.

6. The central tire inflation system of claim 5, wherein said pressure regulator will supply pressurized fluid at said ninth port pressurized to said second pressure value.

7. The central tire inflation system of claim 6, wherein said inflation valve, said deflation valve and said shut-off valve are solenoid controlled valves.

8. The central tire inflation system of claim 6, additionally including a pressure transducer communicating with said first conduit, said pressure transducer providing an output signal indicative of the pressure within said first conduit.

9. The central tire inflation system of claim 8, additionally including operator actuated selector means for selecting a desired pressurization of said interior chamber of said tire.

10. The central tire inflation system of claim 9, wherein said selector means is effective to selectively operate said first, second and third control means, said selector means effective in response to operator selection of a desired inflation pressure to cause said inflation system to assume a selected one of a steady state mode of operation if the selected pressurization equals a measured pressurization, an inflation mode of operation if the selected level of pressurization exceeds the measured level of pressurization and a deflate mode of operation if the selected level of pressurization is less than the measured level of pressurization.

11. The central tire inflation system of claim 10, wherein said steady state mode of operation comprises blocking fluid flow between said sixth and seventh ports, said ninth port and said first conduit, and said eleventh and twelfth ports, said inflation mode of operation comprises establishing fluid communication between said sixth and seventh ports while blocking fluid communication between said ninth port and said first conduit and said eleventh and twelfth ports, and said deflation mode of operation comprises establishing fluid flow between said eighth and ninth ports while blocking fluid flow between said sixth and seventh ports and said eleventh and twelfth ports, and said steady state mode of operation comprises establishing fluid flow between said eleventh and twelfth ports while blocking fluid flow between said sixth and seventh ports and said eight and ninth ports.

12. The central tire inflation system of claim 11, wherein measurement of the inflation in said interior chamber occurs in a pressure measurement mode of operation comprising establishing fluid communication between said sixth and seventh ports for a relatively short period of time and then blocking fluid communication between said sixth and seventh ports while maintaining blocked fluid communication between said eighth and ninth ports and said eleventh and twelfth ports blocked.

13. The central tire inflation system of claim 7, wherein said fourth and fifth ports comprise the sole fluid connections to the interior of said tire valve assembly.

14. The central tire inflation system of claim 1, wherein said pressure relief valve defines a firs valve seat interposed said first and third ports and a second valve seat interposed said second and third ports, a first valve member sealingly engageable with said first valve seat and a second valve member sealingly engageable with said second valve seat, said first valve member defining a first valve surface constantly in fluid communication with said first conduit and a second valve surface in constant fluid communication with said second conduit, said first valve surface of greater surface area than said second valve, fluid pressure on said first valve surface effective to urge said first valve member out of sealing engagement with said first valve seat and fluid pressure on said second valve surface effective to urge said second valve member out of sealing engagement with said second valve seat.

15. The central tire inflation system of claim 6, wherein said pressure relief valve defines a first valve seat interposed said first and third ports and a second valve seat interposed said second and third ports, a first valve member resiliently urged into engagement with said first valve seat and a second valve member sealingly engageable with said second valve seat, said first valve member defining a first valve surface constantly in fluid communication with said first conduit and a second valve surface in constant fluid communication with said second conduit, said first valve surface of greater surface area than said second valve surface, fluid pressure on said first valve surface effective to urge said first valve member out of sealing engagement with said first valve seat and fluid pressure on said second valve surface effective to urge said second valve member out of sealing engagement with said second valve seat.

16. The central tire inflation system of claim 8, wherein said vehicle comprises an air brake system supplied by an air brake reservoir and an onboard compressor supplying pressurized fluid to said air brake reservoir, said central tire inflation system source comprising said compressor, air brake reservoir pressure transducer means and priority valve means controlled by said air brake pressure means for preventing the flow of pressurized fluid from said compressor to said central tire inflation system if said air brake reservoir is below a predetermined air brake reservoir minimum pressure reference value.

17. The central tire inflation system of claim 16, wherein said central tire inflation system source of pressurized fluid comprises a central tire inflation system reservoir and fourth conduit means fluidly connecting said central tire inflation system reservoir with said air brake system and controlled by a one-way valve only permitting the flow of fluid from said central tire inflation system to said air brake system.

18. The central tire inflation system of claim 16, wherein said air brake pressure transducer provides a signal indicative of air brake system pressure to said controller, said controller effective upon air brake system pressure being less than a predetermined reference value and said interior tire pressure exceeding said predetermined minimum air brake reference pressure to fluidly connect said interior tire chamber to said air brake system.

19. The central tire inflation system of claim 18, additionally including a fifth conduit by-passing said pressure relief valve to provide direct fluid communication between said first conduit and said second conduit, fluid flow through said by-pass conduit controlled by a two-way two position normally closed valve having a closed position blocking fluid flow through said fourteenth conduit and an open position establishing fluid flow to said fourteenth conduit, said by-pass valve controlled by said control means.

20. The central tire inflation system of claim 1, additionally comprising a by-pass conduit fluidly connecting said first conduit and said second conduit and a by-pass valve controlling the flow of fluid through said by-pass conduit, said by-pass valve normally biased to a first position blocking the flow of fluid through said by-pass conduit and moveable to a second position establishing a flow of fluid through said by-pass conduit.

21. The central tire inflation system of claim 7, wherein said inflation valve and said deflation valve are normally closed valves and said shut-off valve is a normally open valve.

22. A central tire inflation system for pressurizing a first and a second tire to substantially equal pressure, said system comprising;
control means for selectively pressurizing and exhausting a first conduit;
a first pressure relief valve having a first port for fluid connection to said first conduit, a second port for fluid connection to atmosphere and a third port connected to a second conduit; said pressure relief valve automatically responsive to fluid pressure in said first and second conduits and effective to establish fluid flow between said first and second conduits and to block said second port if the pressurization in said first conduit is equal to or greater than the pressurization in said second conduit and to establish fluid flow between said second conduit and said second port and to block said first port if the pressurization in said second conduit is greater than the pressurization in said first conduit,
first tire valve means rotatably mounted to said first inflatable tire and having a fourth port for fluid connection to said second conduit and a fifth port fluidly connected with the interior pressurized chamber of said first tire, said first tire valve means automatically responsive to pressurization of said second conduit and said pressurized chamber of said first tire to establish and block fluid communication between said fourth port and said fifth port,
a second pressure relief valve having a sixth port for fluid connection to said first conduit, a seventh port for fluid connection to atmosphere and an eighth port connected to a third conduit; said pressure relief valve automatically responsive to fluid pressure in said first and third conduits and effective to establish fluid flow between said sixth and third conduits and to block said eighth port if the pressurization in said first conduit is equal to or greater than the pressurization in said third conduit and to establish fluid flow between said third conduit and said eighth port and to block said sixth port if the pressurization in said third conduit is greater than the pressurization in said first conduit,
second tire valve means rotatably mounted to said second inflatable tire and having a ninth port for fluid connection to said third conduit and a tenth port fluidly connected with the interior pressurized chamber of said second tire, said second tire valve means automatically responsive to pressurization of said third conduit and said pressurized chamber of said second tire to establish and block fluid communication between said ninth port and said fourth port; and,
a fourth conduit fluidly connecting said third and said eighth ports.

23. The central tire inflation system of claim 22, wherein said second and third conduits each include a first portion fixed to said vehicle, a second portion rotatable with said tire and a rotary seal chamber interposed said first and second portions.

* * * * *